(12) United States Patent
Mihara et al.

(10) Patent No.: US 8,997,508 B2
(45) Date of Patent: Apr. 7, 2015

(54) REFRIGERATING APPARATUS

(75) Inventors: Kazuhiko Mihara, Tatebayashi (JP);
Hidetaka Sasaki, Oizumi-machi (JP);
Setsu Hasegawa, Oizumi-machi (JP);
Ken Kawakubo, Oizumi-machi (JP);
Masahisa Otake, Oizumi-machi (JP);
Takashi Sato, Kumagaya (JP); Akira Matsuzaki, Ota (JP)

(73) Assignee: Panasonic Intellectual Property Management Co., Ltd., Osaka-shi (JP)

( * ) Notice: Subject to any disclaimer, the term of this patent is extended or adjusted under 35 U.S.C. 154(b) by 1141 days.

(21) Appl. No.: 12/976,368

(22) Filed: Dec. 22, 2010

(65) Prior Publication Data

US 2011/0154839 A1 Jun. 30, 2011

(30) Foreign Application Priority Data

Dec. 25, 2009 (JP) ................................ 2009-295728
Dec. 25, 2009 (JP) ................................ 2009-295735
Dec. 25, 2009 (JP) ................................ 2009-295737
Dec. 25, 2009 (JP) ................................ 2009-295760
Dec. 25, 2009 (JP) ................................ 2009-295762

(51) Int. Cl.
*F25D 17/00* (2006.01)
*F25B 9/00* (2006.01)
*F25B 1/10* (2006.01)
*F25B 5/02* (2006.01)
*F25B 49/02* (2006.01)

(52) U.S. Cl.
CPC . *F25B 9/008* (2013.01); *F25B 1/10* (2013.01); *F25B 5/02* (2013.01); *F25B 49/027* (2013.01); *F25B 2309/061* (2013.01); *F25B 2339/047* (2013.01); *F25B 2347/021* (2013.01); *F25B 2400/02* (2013.01); *F25B 2400/075* (2013.01); *F25B 2400/13* (2013.01); *F25B 2500/12* (2013.01); *F25B 2500/26* (2013.01); *F25B 2600/021* (2013.01); *F25B 2600/111* (2013.01); *F25B 2600/17* (2013.01); *F25B 2700/2106* (2013.01); *F25B 2700/2117* (2013.01); *Y02B 30/741* (2013.01); *Y02B 30/743* (2013.01)

(58) Field of Classification Search
CPC ........... B23C 1/00; F25D 21/06; F25D 17/06; F25B 49/02; F25B 1/00; F25B 2700/2117; F25B 1/10; F25B 9/008; F25B 49/027; Y02B 30/741; Y02B 30/743
USPC .......... 62/181, 513, 222, 151, 177, 498, 228.1
See application file for complete search history.

(56) References Cited

FOREIGN PATENT DOCUMENTS

JP          47-22774 Y1     7/1972
JP          59-115940 A     7/1984
(Continued)

*Primary Examiner* — Cheryl J Tyler
*Assistant Examiner* — Ana Vazquez
(74) *Attorney, Agent, or Firm* — Westerman, Hattori, Daniels & Adrian, LLP

(57) ABSTRACT

An object of the present invention is to keep an appropriate high pressure side pressure in a refrigerant circuit while reducing noises of an operation of a blower in a refrigerating apparatus which obtains a critical pressure on a high pressure side. The refrigerating apparatus in which the refrigerant circuit is constituted of a compressor, a gas cooler, a reducing element and an evaporator to obtain a supercritical pressure on the high pressure side includes a blower which air-cools the gas cooler and a control device which controls this blower. This control device controls a revolution speed of the blower based on an outdoor temperature and an evaporation temperature of a refrigerant in the evaporator.

6 Claims, 5 Drawing Sheets

(56) References Cited

FOREIGN PATENT DOCUMENTS

| | | |
|---|---|---|
| JP | 62-35166 U | 3/1987 |
| JP | 64-28779 U | 2/1989 |
| JP | 3-95343 A | 4/1991 |
| JP | 5-280795 A | 10/1993 |
| JP | 7-018602 B2 | 3/1995 |
| JP | 2002-89938 A | 3/2002 |
| JP | 2002-130146 A | 5/2002 |
| JP | 2004-251513 A | 9/2004 |
| JP | 2004-286266 A | 10/2004 |
| JP | 2005-180835 A | 7/2005 |
| JP | 2006-242557 A | 9/2006 |
| JP | 2007-139269 A | 6/2007 |
| JP | 2007-154830 A | 6/2007 |
| JP | 2008-8499 A | 1/2008 |
| JP | 2008-39233 A | 2/2008 |
| JP | 2009-257704 A | 11/2009 |
| JP | 2009-270822 A | 11/2009 |
| WO | 2005/022055 A1 | 3/2005 |

REFRIGERATING APPARATUS

BACKGROUND OF THE INVENTION

The present invention relates to a refrigerating apparatus in which a refrigerant circuit is constituted of compression means, a gas cooler, reducing means and an evaporator to obtain a supercritical pressure on a high pressure side.

The present invention also relates to a refrigerating apparatus comprising a first refrigerant flow and a second refrigerant flow regulated in accordance with predetermined control characteristics to obtain a supercritical pressure on a high pressure side.

Heretofore, in this type of refrigerating apparatus, a refrigerating cycle is constituted of the compression means, the gas cooler, the reducing means and the like, and a refrigerant compressed by the compression means releases heat in the gas cooler, has a pressure thereof reduced by the reducing means, and is then evaporated in the evaporator, to cool ambient air by the evaporation of the refrigerant at this time. In recent years, in this type of refrigerating apparatus, Freon-based refrigerant cannot be used owing to a natural environmental problem and the like. Therefore, an apparatus has been developed in which carbon dioxide as a natural refrigerant is used as an alternative of the Freon-based refrigerant. It is known that the carbon dioxide refrigerant has a very large difference between a high pressure and a low pressure, has a low critical pressure and is compressed to obtain a supercritical state on the high pressure side of the refrigerating cycle (e.g., see Japanese Patent Published No. 7-18602 (Patent Document 1)).

As to the above Freon refrigerant, a temperature of the refrigerant has a unique relation to a pressure thereof to perform a saturation cycle. On the other hand, in a supercritical cycle which obtains the supercritical state on the high pressure side as described above, one of the saturation cycle and a gas cycle is performed in accordance with an outdoor temperature. In the saturation cycle, the temperature of the refrigerant has a unique relation to the pressure thereof as in a case where the Freon refrigerant is used, but in the gas cycle, the refrigerant is not liquefied, which causes a problem that when the refrigerant in the refrigerant circuit becomes excess, the temperature of the evaporator lowers but a high pressure side pressure becomes abnormally high.

Moreover, in such a supercritical refrigerant cycle, on conditions that the temperature of the refrigerant at a gas cooler outlet rises owing to a cause such as a high heat source temperature on a gas cooler side (e.g., a high temperature of outside air which is a heat medium subjected to the heat exchange between the medium and the gas cooler), a specific enthalpy at an evaporator inlet increases, thereby causing a problem that a refrigerating effect remarkably deteriorates. In this case, to acquire a refrigerating ability, the high pressure side pressure needs to be raised, thereby increasing a compression power, to cause a disadvantage that a coefficient of performance also deteriorates.

Therefore, there has been suggested a so-called split cycle (two-stage compression one-stage expansion intermediate refrigerating cycle) refrigerating apparatus in which a refrigerant cooled by a gas cooler is branched into two refrigerant flows, one branched refrigerant flow (a first refrigerant flow) has a pressure thereof reduced by auxiliary reducing means and is then passed through one passage (a first flow path) of an intermediate heat exchanger, and the other refrigerant flow (a second refrigerant flow) is passed through the other flow path (a second flow path) disposed so as to perform heat exchange between the flow path and the first flow path of the intermediate heat exchanger, and is then evaporated by an evaporator via main reducing means.

In the above split cycle apparatus, the first refrigerant flow obtained by branching the refrigerant which has released heat in the gas cooler can have the pressure thereof reduced and be expanded to cool the second refrigerant flow, whereby the specific enthalpy at the evaporator inlet can be decreased. In consequence, a refrigerating effect can be improved, and a performance can be enhanced effectively as compared with a conventional apparatus. However, a cooling effect by the first refrigerant flow for cooling the second refrigerant flow before reducing the pressure of the second refrigerant flow depends on the amount of the first and second refrigerant flows passing through the intermediate heat exchanger.

That is, when the amount of the first refrigerant flow is excessively large, the amount of the second refrigerant flow finally evaporated by the evaporator becomes inadequate. Conversely, when the amount of the first refrigerant flow is excessively small, the cooling effect by the first refrigerant flow (i.e., the effect of the split cycle) diminishes. On the other hand, the pressure of the first refrigerant flow having the pressure thereof reduced by the auxiliary reducing means is the pressure of the refrigerant circuit on a medium pressure side, and control of this medium pressure side pressure requires control of the amount of the first refrigerant flow. Therefore, to obtain an optimum performance improvement effect, these refrigerant flows need to be appropriately controlled.

On the other hand, when the amount of the first refrigerant flow is so large that the flow cannot completely be evaporated and the flow returns to the compression means, a liquid back-flow occurs in the second-stage compression means. Therefore, when a predetermined superheat degree is not kept in the intermediate heat exchanger, liquid compression by the compression means is incurred. Therefore, it is necessary to control the discharged gas temperature of the compression means while considering the efficiency of the refrigerating cycle, so that a larger superheat degree is acquired.

Moreover, in the above refrigerating apparatus, during a usual operation, the pressure of a medium pressure region of the refrigerant circuit (e.g., the medium pressure region of the refrigerant discharged from a first compression element of the compression means comprising two-stage compression means) is normally lower than the pressure of a high pressure region (the high pressure region of the refrigerant discharged from a second compression element of such compression means). On the other hand, at the start of the compression means, when the outdoor temperature is high, the compression means starts from a high pressure state of a low pressure region of the refrigerant circuit. Therefore, the pressure of the medium pressure region rises early. At this time, the refrigerant of the high pressure region of the refrigerant circuit is cooled by the gas cooler, and does not immediately reach a high temperature. Therefore, the pressure of the medium pressure region of the refrigerant circuit comes close to the pressure of the high pressure region, and differential pressure between the refrigerant pressure of the medium pressure region and the refrigerant pressure of the high pressure region cannot sufficiently be acquired, thereby bringing the compressed state of the refrigerant into a compression defect state.

This incurs the start defect of the compression means, and the cooling ability of the refrigerating apparatus remarkably deteriorates. Moreover, a problem might occur that the power of the compression means increases to deteriorate the efficiency of the refrigerating cycle.

On the other hand, usually when the compression means stops, pressures of the compression means on a discharge side and a suction side are equalized. Moreover, the compression means starts from an equalized pressure state. However, in the refrigerating apparatus which obtains the supercritical pressure on the high pressure side as described above, the refrigerant circuit on the high pressure side and the medium pressure side cannot sufficiently be sealed via a discharge valve in a sealed container constituting the compression means, and these pressures are easily equalized. On the other hand, the pressures of the refrigerant circuit on the low pressure side and medium pressure side are not easily equalized in the sealed container, partially because the container on the low pressure side is immersed into oil. Moreover, since there is a large pressure difference in the refrigerant circuit, predetermined time is necessary for equalizing the pressures of the whole refrigerant circuit, thereby causing a problem that start properties deteriorate.

Moreover, when the refrigerating apparatus is employed as a refrigerating equipment in a supermarket or the like, evaporators are arranged in parallel with each other in each showcase, and reducing means disposed for the evaporators are controlled to realize cooling control in each showcase. In each showcase, to eliminate frosting of the evaporators, a defrosting operation is executed. In this case, the reducing means of the evaporator to be subjected to the defrosting operation is closed, and the defrosting operation is performed by heating with a heater or the like, an off-cycle operation or supply of a hot gas through a hot gas pipe disposed in the showcase.

However, during the off-cycle operation, the defrosting operation requires much time. During the heating with the heater, steep rise of the number of components and steep rise of running cost thereof are incurred. Moreover, when the hot gas pipe is disposed, a problem occurs that the whole system becomes complicated.

SUMMARY OF THE INVENTION

The present invention has been developed to solve conventional technical problems, and an object thereof is to provide a refrigerating apparatus which obtains a critical pressure on a high pressure side and can keep an appropriate high pressure side pressure in a refrigerant circuit while reducing noises of an operation of a blower.

Another object of the present invention is to obtain an adequate medium pressure of the refrigerant circuit of the refrigerating apparatus and precisely obtain the effect of a split cycle, thereby enhancing the performance of the refrigerating apparatus.

Still another object of the present invention is to provide a refrigerating apparatus in which the start defect of compression means can be improved to realize a stable and efficient operation.

A further object of the present invention is to remarkably improve the start properties of the compression means in the refrigerating apparatus which obtains a supercritical pressure on a high pressure side.

A still further object of the present invention is to provide a refrigerating apparatus in which defrosting of each evaporator can smoothly performed without disposing any special heating means or complicated piping line.

According to a first aspect of the present invention, there is provided a refrigerating apparatus in which a refrigerant circuit is constituted of compression means, a gas cooler, reducing means and an evaporator to obtain a supercritical pressure on a high pressure side, characterized by comprising: a blower which air-cools the gas cooler; and control means for controlling this blower, wherein this control means controls a revolution speed of the blower based on an outdoor temperature and an evaporation temperature of a refrigerant in the evaporator.

A second aspect of the present invention is characterized in that in the above aspect of the invention, the control means determines a target value of a high pressure side pressure of the refrigerant circuit based on the outdoor temperature and the evaporation temperature, and controls the blower so as to obtain the target value of the high pressure side pressure.

A third aspect of the present invention is characterized in that in the above aspects of the invention, as the outdoor temperature becomes lower, the control means determines the target value in such a direction as to lower the target value, and as the evaporation temperature becomes higher, the control means determines the target value in such a direction as to raise the target value.

A fourth aspect of the present invention is characterized in that in the above aspects of the invention, carbon dioxide is used as the refrigerant.

According to a fifth aspect of the present invention, there is provided a refrigerating apparatus in which a refrigerant circuit is constituted of compression means, a gas cooler, auxiliary reducing means, an intermediate heat exchanger, main reducing means and an evaporator, the refrigerating apparatus being configured to branch a refrigerant exiting from the gas cooler into two flows, pass a first refrigerant flow through a first flow path of the intermediate heat exchanger via the auxiliary reducing means, pass a second refrigerant flow through a second flow path of the intermediate heat exchanger and then through the evaporator via the main reducing means, perform heat exchange between the first refrigerant flow and the second refrigerant flow in the intermediate heat exchanger, suck the refrigerant exiting from the evaporator into a low pressure portion of the compression means and suck the first refrigerant flow exiting from the intermediate heat exchanger into a medium pressure portion of the compression means, to obtain a supercritical pressure on a high pressure side, characterized by comprising control means for controlling the auxiliary reducing means, wherein the control means calculates a first control amount exerted in such a direction as to increase an open degree of the auxiliary reducing means in a case where a temperature DT of the refrigerant discharged from the compression means is higher than a predetermined value DT0, a second control amount exerted in such a direction as to increase the open degree of the auxiliary reducing means in a case where an over-compression judgment value MPO obtained from a pressure MP of a medium pressure region of the refrigerant circuit and a low pressure side pressure LP of the refrigerant circuit is lower than a high pressure side pressure HP of the refrigerant circuit, and a third control amount exerted in such a direction as to increase the open degree of the auxiliary reducing means in a case where a difference (GCT-LT) between a temperature GCT of the refrigerant discharged from the gas cooler and a temperature LT of the second refrigerant flow discharged from the intermediate heat exchanger is smaller than a predetermined value SP, and the control means adds up these first to third control amounts to determine an operation amount of the valve open degree of the auxiliary reducing means.

According to a sixth aspect of the present invention, there is provided a refrigerating apparatus in which a refrigerant circuit is constituted of compression means, a gas cooler, auxiliary reducing means, an intermediate heat exchanger, main reducing means and an evaporator, the refrigerating apparatus being configured to branch a refrigerant exiting from the gas cooler into two flows, pass a first refrigerant flow through a first flow path of the intermediate heat exchanger via the auxiliary reducing means, pass a second refrigerant flow through a second flow path of the intermediate heat exchanger and then through the evaporator via the main reducing means, perform heat exchange between the first refrigerant flow and the second refrigerant flow in the intermediate heat exchanger, suck the refrigerant exiting from the evaporator into a low pressure portion of the compression means and suck the first refrigerant flow exiting from the intermediate heat exchanger into a medium pressure portion of the compression means, to obtain a supercritical pressure on a high pressure side, characterized by comprising control means for controlling the auxiliary reducing means, wherein this control means calculates a first control amount exerted in such a direction as to increase an open degree of the auxiliary reducing means in a case where a temperature DT of the refrigerant discharged from the compression means is higher than a predetermined value DT0, a second control amount exerted in such a direction as to increase the open degree of the auxiliary reducing means in a case where a pressure MP of a medium pressure region of the refrigerant circuit is lower than an adequate medium pressure value obtained from a high pressure side pressure HP and a low pressure side pressure LP of the refrigerant circuit, and a third control amount exerted in such a direction as to increase the open degree of the auxiliary reducing means in a case where a difference (GCT-LT) between a temperature GCT of the refrigerant discharged from the gas cooler and a temperature LT of the second refrigerant flow discharged from the intermediate heat exchanger is smaller than a predetermined value SP, and the control means adds up these first to third control amounts to determine an operation amount of the valve open degree of the auxiliary reducing means.

A seventh aspect of the present invention is characterized in that in the above fifth or sixth aspect of the invention, the control means determines the operation amount in such a direction as to decrease the valve open degree of the auxiliary reducing means in a case where the temperature LT is lower than a predetermined value or a temperature DT-GCT is lower than a predetermined value TDT.

An eighth aspect of the present invention is characterized in that in the above aspects of the invention, the control means raises the predetermined value SP and lowers the predetermined value TDT in a case where the high pressure side pressure HP is in a supercritical range, and the control means lowers the predetermined value SP and raises the predetermined value TDT in a case where the high pressure side pressure HP is in a saturated range.

A ninth aspect of the present invention is characterized in that in the above fifth to eighth aspects of the invention, the compression means comprises first and second compression elements, and sucks the refrigerant from the refrigerant circuit on a low pressure side into the first compression element to compress the refrigerant, sucks the refrigerant discharged from the first compression element and having a medium pressure into the second compression element to compress the refrigerant, and discharges the refrigerant to the refrigerant circuit on the high pressure side, the refrigerating apparatus further comprising an intercooler which air-cools the refrigerant discharged from the first compression element, wherein the first refrigerant flow exiting from the intermediate heat exchanger is returned to the intercooler on an outlet side.

A tenth aspect of the present invention is characterized in that in the above fifth to ninth aspects of the invention, carbon dioxide is used as the refrigerant.

According to an eleventh aspect of the present invention, there is provided a refrigerating apparatus in which a refrigerant circuit is constituted of compression means, a gas cooler, reducing means and an evaporator to obtain a supercritical pressure on a high pressure side, characterized by comprising: a bypass circuit which connects a medium pressure region of the refrigerant circuit to a low pressure region thereof; a valve device disposed in this bypass circuit; and control means for controlling this valve device, wherein this control means opens a flow path of the bypass circuit by the valve device until an operation frequency rises to a predetermined operation frequency at the start of the compression means.

A twelfth aspect of the present invention is characterized in that in the above aspect of the invention, carbon dioxide is used as a refrigerant.

According to a thirteenth aspect of the present invention, there is provided a refrigerating apparatus in which a refrigerant circuit is constituted of compression means, a gas cooler, reducing means and an evaporator to obtain a supercritical pressure on a high pressure side, characterized by comprising a check valve disposed in a discharge piping line of the compression means.

A fourteenth aspect of the present invention is characterized in that in the above aspect of the invention, a plurality of compression means are disposed and connected in parallel with one another, and the check valves are disposed at positions before the discharge piping lines of the respective compression means join one another.

A fifteenth aspect of the present invention is characterized in that in the above thirteenth or fourteenth aspect of the invention, the check valve is a lead valve.

A sixteenth aspect of the present invention is characterized in that above thirteenth to fifteenth aspects of the invention further comprise a container disposed in the discharge piping line of the compression means and having a predetermined capacity, wherein the check valve is attached in the upper part of the container.

A seventeenth aspect of the present invention is characterized in that the above aspect of the invention further comprises an oil return tube which connects the lower end portion of the container to the compression means.

An eighteenth aspect of the present invention is characterized in that in the above thirteenth to seventeenth aspects of the invention, carbon dioxide is used as a refrigerant.

According to a nineteenth aspect of the present invention, there is provided a refrigerating apparatus in which a refrigerant circuit is constituted of compression means, a gas cooler, a plurality of reducing means and a plurality of evaporators, characterized by comprising: a communicating tube which connects one evaporator on an outlet side, to the reducing means corresponding to the other evaporator on an inlet side; flow path control means for controlling a refrigerant exiting from the evaporator so that the refrigerant flows through the communicating tube or returns to the compression means; and control means for controlling the reducing means and the flow path control means, wherein during defrosting of the one evaporator, the control means fully opens the reducing means corresponding to the evaporator and allows the refrigerant exiting from the evaporator to flow through the communicating tube.

A twentieth aspect of the present invention is characterized in that in the above aspect of the invention, the refrigerant circuit obtains a supercritical pressure on a high pressure side.

A twenty-first aspect of the present invention is characterized in that the above nineteenth or twentieth aspect of the invention further comprises a gas cooler bypass circuit which bypasses the gas cooler; and a valve device disposed in this gas cooler bypass circuit, wherein during the defrosting of the evaporator, the control means opens a flow path of the gas cooler bypass circuit by the valve device.

A twenty-second aspect of the present invention is characterized in that in the above nineteenth to twenty-first aspects of the invention, carbon dioxide is used as the refrigerant.

According to the first aspect of the present invention, there is provided the refrigerating apparatus in which the refrigerant circuit is constituted of the compression means, the gas cooler, the reducing means and the evaporator to obtain the supercritical pressure on the high pressure side, comprising the blower which air-cools the gas cooler; and the control means for controlling this blower. This control means controls the revolution speed of the blower based on the outdoor temperature and the evaporation temperature of the refrigerant in the evaporator to obtain the supercritical pressure on the high pressure side. Even this refrigerating apparatus can control the revolution speed of the blower so as to obtain an appropriate high pressure side pressure, and can realize a highly efficient operation while reducing noises of an operation of the blower.

According to the second aspect of the present invention, in the above aspect, the control means determines the target value of the high pressure side pressure of the refrigerant circuit based on the outdoor temperature and the evaporation temperature. For example, as in the third aspect of the present invention, as the outdoor temperature becomes lower, the control means determines the target value in such a direction as to lower the target value, and as the evaporation temperature becomes higher, the control means determines the target value in such a direction as to raise the target value. The control means controls the blower so as to obtain the target value of the high pressure side pressure. In consequence, it is possible to realize a preferable high pressure side pressure in consideration of a state of the refrigerant which changes to a saturation cycle and a gas cycle in accordance with the outdoor temperature and based on the evaporation temperature, thereby realizing a highly efficient operation.

The above aspects of the invention are especially effective in a supercritical refrigerant circuit (a supercritical refrigerating cycle) in which carbon dioxide is used as the refrigerant as in the fourth aspect of the present invention.

Moreover, in the refrigerating apparatus of the present invention, the first refrigerant flow obtained by branching the refrigerant which has released heat in the gas cooler can have the pressure thereof reduced and can be expanded by the auxiliary reducing means to cool the second refrigerant flow, whereby a specific enthalpy at an evaporator inlet can be decreased. In consequence, a refrigerating effect can be improved, and a performance can be enhanced effectively as compared with a conventional apparatus. Furthermore, the first branched refrigerant flow is returned to the medium pressure portion of the compression means. Therefore, the amount of the second refrigerant flow sucked into the low pressure portion of the compression means decreases, and a compression work amount in the compression means for compression from a low pressure to a medium pressure decreases. In consequence, a compression power in the compression means decreases to improve a coefficient of performance.

Here, the effect of the above so-called split cycle depends on the amount of the first and second refrigerant flows passing through the intermediate heat exchanger. That is, when the amount of the first refrigerant flow is excessively large, the amount of the second refrigerant flow finally evaporated by the evaporator becomes inadequate. Conversely, when the amount of the first refrigerant flow is excessively small, the effect of the split cycle diminishes. On the other hand, the pressure of the first refrigerant flow having the pressure reduced by the auxiliary reducing means is the medium pressure of the refrigerant circuit, and control of the medium pressure requires control of the amount of the first refrigerant flow.

Therefore, according to the fifth aspect of the present invention, the control means calculates the first control amount exerted in such a direction as to increase the open degree of the auxiliary reducing means in the case where the temperature DT of the refrigerant discharged from the compression means is higher than the predetermined value DT0, the second control amount exerted in such a direction as to increase the open degree of the auxiliary reducing means in the case where the over-compression judgment value MPO obtained from the pressure MP of the medium pressure region of the refrigerant circuit and the low pressure side pressure LP of the refrigerant circuit is lower than the high pressure side pressure HP of the refrigerant circuit, and the third control amount exerted in such a direction as to increase the open degree of the auxiliary reducing means in the case where the difference (GCT-LT) between the temperature GCT of the refrigerant discharged from the gas cooler and the temperature LT of the second refrigerant flow discharged from the intermediate heat exchanger is smaller than the predetermined value SP, and the control means adds up these first to third control amounts to determine the operation amount of the valve open degree of the auxiliary reducing means. Moreover, as in the seventh aspect of the present invention, the control means determines the operation amount in such a direction as to decrease the valve open degree of the auxiliary reducing means in the case where the temperature LT is lower than the predetermined value or the temperature DT-GCT is lower than the predetermined value TDT. Therefore, the temperature DT of the discharged refrigerant can be kept to be not higher than the predetermined value DT0 by the first control amount, and the adequate medium pressure MP of the refrigerant circuit can be obtained by the second control amount, whereby adequate pressure differences among the low pressure side pressure LP, the medium pressure MP and the high pressure side pressure HP can be kept. Moreover, the temperature LT of the second refrigerant flow passed through the intermediate heat exchanger can be lowered by the third control amount to keep the refrigerating effect. In consequence, high efficiency and stability of the refrigerating apparatus can be acquired.

Moreover, according to the sixth aspect of the present invention, in place of the second control amount of the above fifth aspect of the invention, the control means calculates the second control amount exerted in such a direction as to increase the open degree of the auxiliary reducing means in the case where the pressure MP of the medium pressure region of the refrigerant circuit is lower than the adequate medium pressure value obtained from the high pressure side pressure HP and the low pressure side pressure LP of the refrigerant circuit, and adds up the first to third control amounts to determine the operation amount of the valve open degree of the auxiliary reducing means. Also in this case, it is possible to obtain the adequate medium pressure MP of the refrigerant circuit and, accordingly, it is possible to keep the adequate pressure differences among the low pressure side pressure LP, the medium pressure MP and the high pressure side pressure HP.

Furthermore, according to the eighth aspect of the present invention, in the above seventh aspect of the invention, the control means raises the predetermined value SP and lowers the predetermined value TDT in the case where the high pressure side pressure HP is in the supercritical range, and the control means lowers the predetermined value SP and raises the predetermined value TDT in the case where the high pressure side pressure HP is in the saturated range, whereby it is possible to vary the predetermined values SP and TDT of the third and first control amounts, thereby separately controlling the case where the high pressure side pressure HP is in the supercritical range and the case where the pressure is in the saturated range.

In consequence, even when the high pressure side pressure HP is in the saturated range, a superheat degree in the intermediate heat exchanger can securely be acquired, thereby avoiding a disadvantage that a liquid backflow occurs in the compression means. Moreover, when the high pressure side pressure HP is in the supercritical range, such a liquid backflow does not occur, and the value can be set in favor of the efficiency.

According to the ninth aspect of the present invention, in the above fifth to eighth aspects of the invention, the compression means comprises the first and second compression elements, and sucks the refrigerant from the refrigerant circuit on the low pressure side into the first compression element to compress the refrigerant, sucks the refrigerant discharged from the first compression element and having the medium pressure into the second compression element to compress the refrigerant, and discharges the refrigerant to the refrigerant circuit on the high pressure side. The refrigerating apparatus further comprises the intercooler which air-cools the refrigerant discharged from the first compression element, wherein the first refrigerant flow exiting from the intermediate heat exchanger is returned to the intercooler on the outlet side. In consequence, it is possible to prevent a pressure drop in the intercooler and to smoothly join the refrigerant flow exiting from the intermediate heat exchanger on the medium pressure side of the refrigerant circuit.

Especially when carbon dioxide is used as the refrigerant as in the tenth aspect of the present invention, the above aspects of the invention can effectively improve a refrigerating ability and enhance a performance.

According to the eleventh aspect of the present invention, there is provided the refrigerating apparatus in which the refrigerant circuit is constituted of the compression means, the gas cooler, the reducing means and the evaporator to obtain the supercritical pressure on the high pressure side. The refrigerating apparatus comprises the bypass circuit which connects the medium pressure region of the refrigerant circuit to the low pressure region thereof; the valve device disposed in this bypass circuit; and the control means for controlling this valve device. This control means opens the flow path of the bypass circuit by the valve device until the operation frequency rises to the predetermined operation frequency at the start of the compression means. In consequence, it is possible to allow the refrigerant of the medium pressure region of the refrigerant circuit to flow into the low pressure region via the bypass circuit, and to equalize pressures of the medium pressure region and the low pressure region.

When the compression means is started to raise the frequency to the predetermined operation frequency at the start of the compression means, a predetermined torque cannot be acquired, but during this start, the pressures of the medium and low pressure regions can be equalized to eliminate a disadvantage that the medium pressure comes close to the high pressure, even when the medium pressure easily becomes high owing to the high outdoor temperature.

Therefore, it is possible to beforehand avoid a start defect due to the pressure of the medium pressure region coming close to the pressure of the high pressure region while torque inadequacy occurs at the start of the compression means, and it is possible to realize a stable and efficient operation.

Moreover, when carbon dioxide is used as the refrigerant as in the twelfth aspect of the present invention, the above eleventh aspect of the invention can effectively improve a refrigerating ability and enhance a performance.

According to the thirteenth aspect of the present invention, there is provided the refrigerating apparatus in which the refrigerant circuit is constituted of the compression means, the gas cooler, the reducing means and the evaporator to obtain the supercritical pressure on the high pressure side, and the refrigerating apparatus comprises the check valve disposed in the discharge piping line of the compression means, whereby it is possible to keep the high pressure side pressure of the refrigerant circuit by the check valve. In consequence, even when the compression means stops, the high pressure side pressure of the refrigerant circuit can be kept to improve start properties.

Moreover, the pressures in the whole refrigerant circuit are not equalized, which can secure the efficiency of the refrigerating cycle apparatus.

According to the fourteenth aspect of the present invention, in addition to the above aspect of the invention, the plurality of compression means are disposed and connected in parallel with one another, and the check valves are disposed at the positions before the discharge piping lines of the respective compression means join one another, which enables an additional operation of a multi-mechanism compressor to improve capacity control properties.

According to the fifteenth aspect of the present invention, in addition to the above thirteenth or fourteenth aspect of the invention, since the check valve is the lead valve, it is possible to eliminate generation of noises.

According to the sixteenth aspect of the present invention, the above thirteenth to fifteenth aspects of the invention further comprise the container disposed in the discharge piping line of the compression means and having the predetermined capacity, wherein the check valve is attached in the upper part of the container, whereby it is possible to achieve leveling of pulsation by a muffler effect. Moreover, the container can perform a function of an oil separator.

Moreover, according to the seventeenth aspect of the present invention, the above aspect of the invention further comprises the oil return tube which connects the lower end portion of the container to the compression means, whereby it is possible to smoothly return oil stored in the container to the compression means via the oil return tube connected to the lower end portion of the container.

When carbon dioxide is used as the refrigerant as in the eighteenth aspect of the present invention, it is possible to effectively improve a refrigerating ability of the refrigerating apparatus of the above thirteenth to seventeenth aspects of the invention, thereby enhancing a performance of the apparatus.

According to the nineteenth aspect of the present invention, there is provided the refrigerating apparatus in which the refrigerant circuit is constituted of the compression means, the gas cooler, the plurality of reducing means and the plurality of evaporators. The refrigerating apparatus comprises the communicating tube which connects the one evaporator on the outlet side to the reducing means corresponding to the other evaporator on the inlet side; the flow path control means for controlling the refrigerant exiting from the evaporator so that the refrigerant flows through the communicating tube or returns to the compression means; and the control means for controlling the reducing means and the flow path control means, wherein during the defrosting of the one evaporator, the control means fully opens the reducing means corresponding to the evaporator and allows the refrigerant exiting from the evaporator to flow through the communicating tube. In consequence, the refrigerant can be allowed to release heat in the evaporator, thereby performing the defrosting of the evaporator. Furthermore, the refrigerant liquefied by releasing the heat flows into the reducing means corresponding to the other evaporator on the inlet side via the communicating tube, and the refrigerant can have the pressure thereof reduced and be expanded by the reducing means to evaporate in the other evaporator.

In consequence, it is possible to eliminate a disadvantage that the refrigerant liquefied by defrosting the one evaporator directly returns to the compression means, thereby realizing the defrosting of each evaporator with a simple constitution.

According to the twentieth aspect of the present invention, in addition to the above aspect of the invention, the refrigerant circuit obtains the supercritical pressure on the high pressure side, which enables improvement of an evaporator defrosting efficiency.

According to the twenty-first aspect of the present invention, the above nineteenth or twentieth aspect of the invention further comprises the gas cooler bypass circuit which bypasses the gas cooler; and the valve device disposed in this gas cooler bypass circuit, wherein during the defrosting of the evaporator, the control means opens the flow path of the gas cooler bypass circuit by the valve device. In consequence, when the temperature of the refrigerant flowing into the evaporator to be defrosted is low at a low outdoor temperature or the like, it is possible to supply a refrigerant having a higher temperature, thereby realizing efficient defrosting.

When carbon dioxide is used as the refrigerant as in the twenty-second aspect of the present invention, the temperature of the refrigerant discharged from the compression means becomes high in the refrigerating apparatus of the above nineteenth to twenty-first aspects of the invention. In consequence, it is possible to enhance an evaporator defrosting performance.

DETAILED DESCRIPTION OF THE PREFERRED EMBODIMENT

Figure 1:
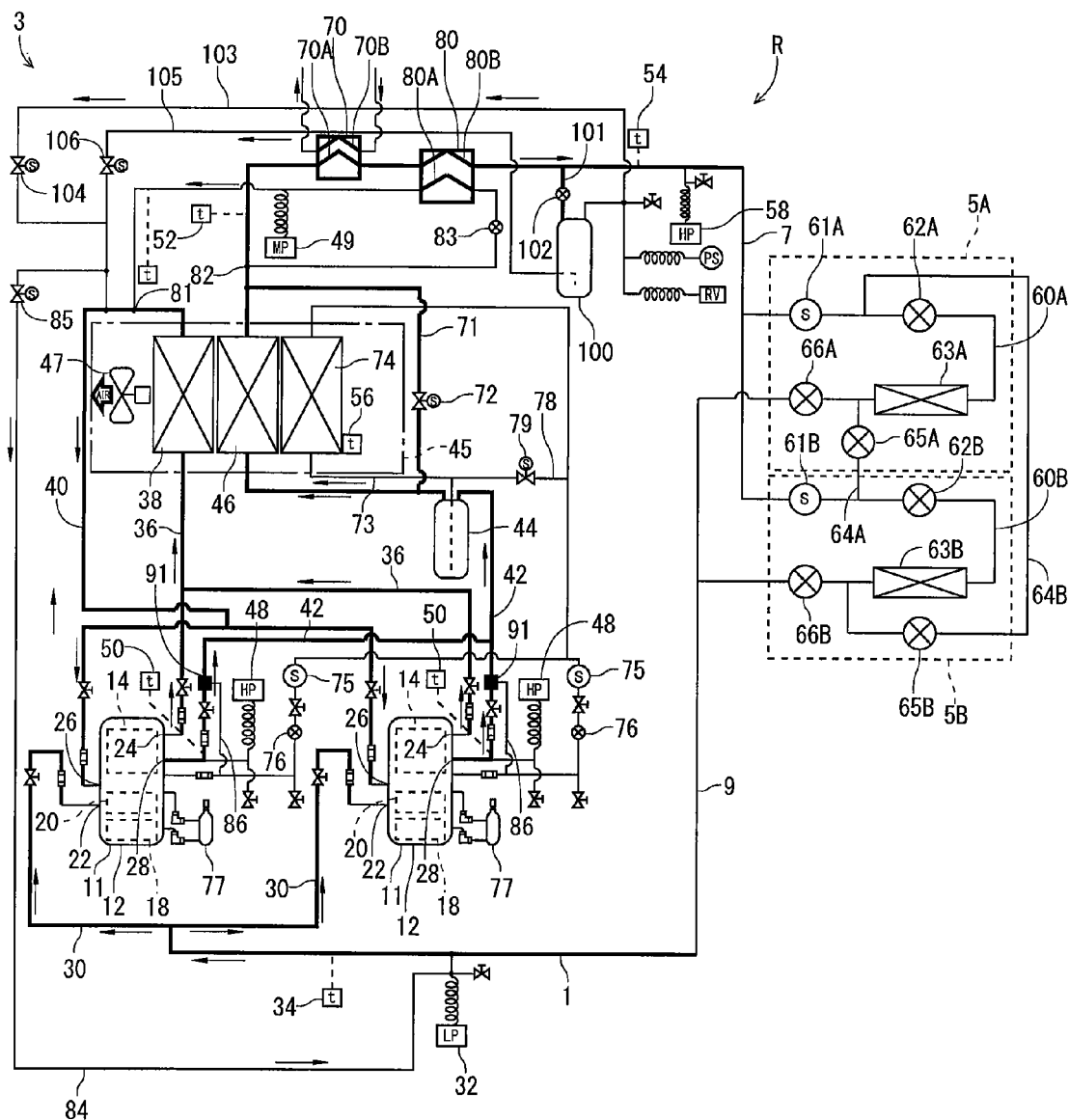
FIG. 1 is a refrigerant circuit diagram of a refrigerating apparatus in an embodiment of the present invention.

Hereinafter, an embodiment of the present invention will be described with reference to the drawings. FIG. 1 is a refrigerant circuit diagram of a refrigerating apparatus R according to the embodiment of the present invention. The refrigerating apparatus R in the present embodiment comprises a refrigerator unit 3 and a plurality of showcase units 5A and 5B, and the refrigerator unit 3 is connected to the showcase units 5A and 5B via refrigerant piping lines 7 and 9 to constitute a predetermined refrigerating cycle.

In this refrigerating cycle, carbon dioxide is used as a refrigerant to obtain a refrigerant pressure which is not lower than a critical pressure of the refrigerant (supercritical) on a high pressure side (a high pressure side pressure). This carbon dioxide refrigerant is an environmentally friendly natural refrigerant which is used in consideration of flammability, toxicity and the like. Moreover, as lubricating oil, existing oil such as mineral oil, alkyl benzene oil, ether oil, ester oil or polyalkyl glycol is used.

The refrigerator unit 3 comprises two compressors 11 and 11 arranged in parallel. In the present embodiment, the compressor 11 is an internal medium pressure multistage compression type rotary compressor constituted of a cylindrical sealed container 12 made of a steel plate; and a rotary compression mechanical portion including an electromotive element 14 as a driving element disposed on the upside of an internal space of the sealed container 12, and a first (low stage side) rotary compression element (a first compression element) 18 and a second (high stage side) rotary compression element (a second compression element) 20 arranged on the downside of the electromotive element 14 and driven by a rotary shaft 16 of the electromotive element 14.

The first rotary compression element 18 compresses a low pressure refrigerant sucked from a refrigerant circuit 1 on a low pressure side into the compressor 11 via the refrigerant piping line 9 to raise the pressure of the refrigerant to a medium pressure, thereby discharging the refrigerant. The second rotary compression element 20 further sucks the refrigerant compressed by the first rotary compression element 18, discharged therefrom and having the medium pressure to compress the refrigerant, raises the pressure thereof to a high pressure, and discharges the refrigerant to the refrigerant circuit 1 on the high pressure side. The compressor 11 is a variable frequency type compressor which can vary an operation frequency of the electromotive element 14 to control a revolution speed of the first rotary compression element 18 and the second rotary compression element 20.

In the side surface of the sealed container 12 of the compressor 11, there are formed a low stage side suction port 22 and a low stage side discharge port 24 connected to the first rotary compression element 18 and a high stage side suction port 26 and a high stage side discharge port 28 connected to the second rotary compression element 20. The low stage side suction ports 22 and 22 of the compressors 11 and 11 are connected to refrigerant introduction tubes 30, respectively, and the tubes join each other on an upstream side and are connected to the refrigerant piping line 9, respectively.

A low pressure (LP: about 4 MPa in a usual operation state) refrigerant gas sucked into a low pressure portion of the first rotary compression element 18 through the low stage side suction port 22 has a pressure thereof raised to a medium pressure (MP: about 8 MPa in the usual operation state) by the first rotary compression element 18, and is discharged into the sealed container 12. In consequence, the medium pressure (MP) is obtained in the sealed container 12.

Moreover, the low stage side discharge ports 24 and 24 of the compressors 11 and 11 through which the medium-pressure refrigerant gas in the sealed container 12 is discharged are connected to medium pressure discharge piping lines 36 and 36, respectively, and the lines join each other on a downstream side and are connected to one end of an intercooler 38, respectively. The intercooler 38 air-cools the medium-pressure refrigerant discharged from the first rotary compression element 18, and the other end of the intercooler 38 is connected to a medium pressure suction tube 40. The medium pressure suction tube 40 is branched into two tubes which are then connected to the high stage side suction ports 26 and 26 of the compressors 11 and 11.

The medium pressure (MP) refrigerant gas sucked into a medium pressure portion of the second rotary compression element 20 through the high stage side suction port 26 is subjected to second-stage compression by the second rotary compression element 20, and becomes a high-temperature high-pressure (HP: a supercritical pressure of about 12 MPa in the usual operation state) refrigerant gas.

Furthermore, the high stage side discharge ports 28 and 28 disposed in the second rotary compression elements 20 of the compressors 11 and 11 on a high pressure chamber side are connected to high pressure discharge piping lines 42 and 42, respectively, and the lines join each other on the downstream side thereof and are connected to the refrigerant circuit 7 via an oil separator 44, a gas cooler 46, an exhaust heat recovery heat exchanger 70 described later in detail and an intermediate heat exchanger 80 constituting a split cycle.

The gas cooler 46 cools the high-pressure discharged refrigerant discharged from the compressor 11, and a blower 47 for the gas cooler which air-cools the gas cooler 46 is disposed in the vicinity of the gas cooler 46. In the present embodiment, the gas cooler 46 is disposed in parallel with the intercooler 38 and an oil cooler 74 described later in detail, and these coolers are arranged in the same air path 45. In the air path 45, an outdoor temperature sensor (outdoor temperature detection means) 56 is disposed so as to detect the outdoor temperature where the refrigerator unit 3 is disposed.

Moreover, the high stage side discharge ports 28 and 28 are connected to high pressure sensors (high pressure detection means) 48 which detect the discharge pressure of the refrigerant discharged from the second rotary compression elements 20 and 20, discharge temperature sensors (discharge temperature detection means) 50 which detect the temperature of the discharged refrigerant, and refrigerant regulators 91 each comprising a check valve 90 having a direction from the high stage side discharge port 28 of the compressor 11 to the gas cooler 46 (the oil separator 44) as a forward direction. It is to be noted that details of the refrigerant regulator 91 will be described later.

On the other hand, the showcase units 5A and 5B are installed in stores or the like, respectively, and connected in parallel with the refrigerant piping lines 7 and 9, respectively. The showcase units 5A and 5B include case-side refrigerant piping lines 60A and 60B which connect the refrigerant piping line 7 to the refrigerant piping line 9, and the case-side refrigerant piping lines 60A and 60B are successively connected to strainers 61A and 61B, main reducing means 62A and 62B and evaporators 63A and 63B. The evaporators 63A and 63B are disposed adjacent to cold air circulating blowers (not shown) which blow air into the evaporators, respectively. Furthermore, the refrigerant piping line 9 is connected to the low stage side suction ports 22 connected to the first rotary compression elements 18 of the compressors 11 and 11 via the refrigerant introduction tubes 30 as described above. The refrigerant circuit 1 of the refrigerating apparatus R has such a constitution in the present embodiment.

Figure 2:
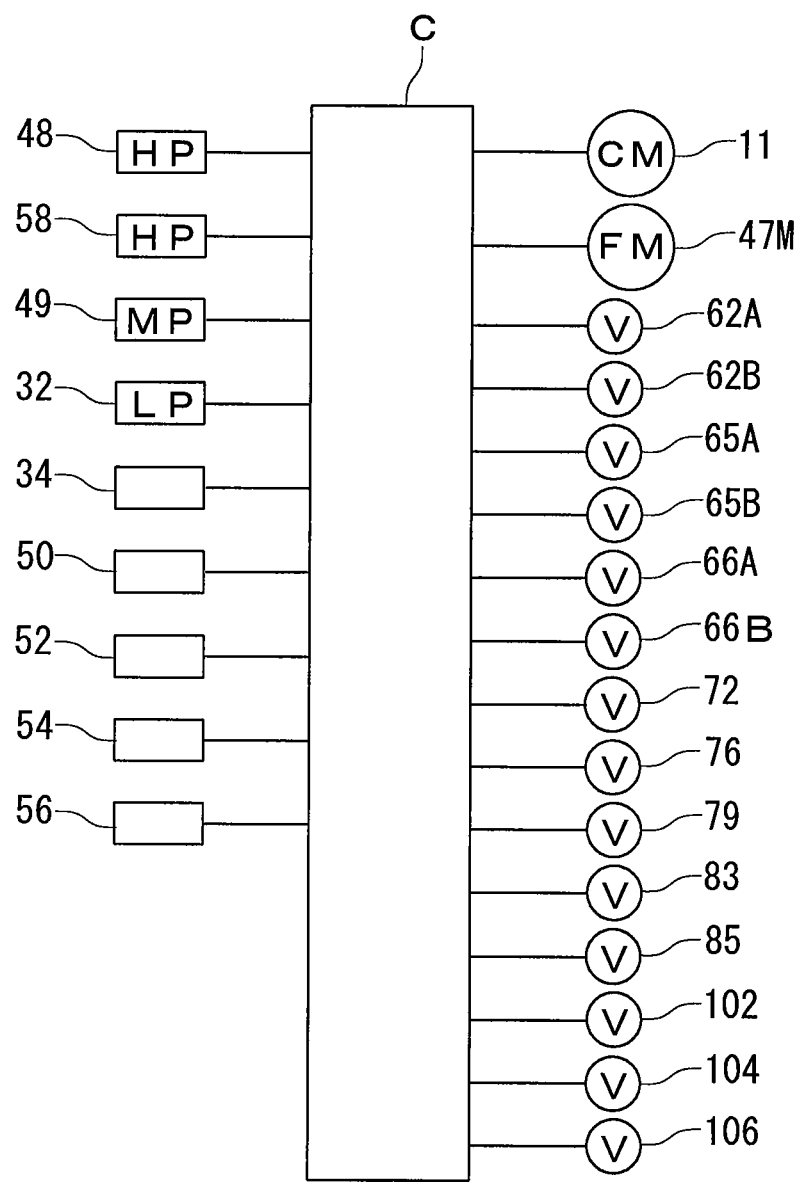
FIG. 2 is a block diagram of a control device of the refrigerating apparatus of FIG. 1.

The refrigerating apparatus R comprises a control device (control means) C comprising a general-purpose microcomputer. As shown in FIG. 2, the control device C is connected to various sensors on an input side, and are connected to various valve devices, the compressors 11 and 11, a fan motor 47M of the blower 47 for the gas cooler and the like on an output side. It is to be noted that details of the control device C will be described later with respect to each control operation.

A Refrigerant Amount Regulation Control Will be Described as (A).

Next, refrigerant amount regulation control of the refrigerant circuit 1 of the refrigerating apparatus R in the present embodiment will be described. The refrigerant circuit 1 which obtains the supercritical pressure on the high pressure side, i.e., on the downstream side of the intermediate heat exchanger 80 of the refrigerator unit 3 is connected to a refrigerant amount regulation tank 100 via a first communicating circuit 101. The refrigerant amount regulation tank 100 has a predetermined volume, and the upper part of the tank 100 is connected to the first communicating circuit 101. The first communicating circuit 101 is provided with an electromotive expansion valve 102 as first opening/closing means having a reducing function. It is to be noted that the opening/closing means having the reducing function is not limited to this example, and may comprise, for example, a capillary tube and an electromagnetic valve (an opening/closing valve) as the reducing means in the first communicating circuit 101.

Furthermore, the refrigerant amount regulation tank 100 is connected to a second communicating circuit 103 which connects the upper part of the tank 100 to a medium pressure region of the refrigerant circuit 1. In the present embodiment, the other end of the second communicating circuit 103 is connected to the outlet-side medium pressure suction tube 40 of the intercooler 38 of the refrigerant circuit 1 as one example of a medium pressure region. The second communicating circuit 103 is provided with an electromagnetic valve 104 as second opening/closing means.

Moreover, the refrigerant amount regulation tank 100 is connected to a third communicating circuit 105 which connects the lower part of the tank 100 to the medium pressure region of the refrigerant circuit 1. In the present embodiment, the other end of the third communicating circuit 105 is connected to the outlet-side medium pressure suction tube 40 of the intercooler 38 of the refrigerant circuit 1 as one example of the medium pressure region in the same manner as in the second communicating circuit 103. The third communicating circuit 105 is provided with an electromagnetic valve 106 as third opening/closing means.

As shown in FIG. 2, the control device C is connected to a unit outlet side pressure sensor (unit outlet side pressure detection means) 58 and the outdoor temperature sensor 56 on the input side. The unit outlet side pressure sensor 58 detects the pressure of the refrigerant flowing toward the showcase units 5A and 5B on the downstream side of the refrigerant amount regulation tank 100. On the output side of the control device, the device is connected to the electromotive expansion valve (the first opening/closing means) 102, the electromagnetic valve (the second opening/closing means) 104, the electromagnetic valve (the third opening/closing means) 106 and the fan motor 47M of the blower 47 for the gas cooler 46. The control device C controls the revolution speed of the fan motor 47M of the blower 47 for the gas cooler based on the detected temperature of the outdoor temperature sensor 56 and the evaporation temperature of the refrigerant in the evaporators 63A and 63B as described later in detail.

A Refrigerant Collecting Operation Will be Described as (A-1).

Hereinafter, the refrigerant collecting operation of the refrigerant circuit 1 will be described. The control device C judges whether or not the detected pressure of the unit outlet side pressure sensor 58 exceeds a predetermined collecting threshold value, or whether or not the detected pressure of the unit outlet side pressure sensor 58 exceeds a predetermined collecting protection value which is lower than the collecting threshold value and whether or not the revolution speed of the blower 47 for the gas cooler is a maximum value.

In the present embodiment, the medium pressure (MP) of the refrigerant circuit 1 is set to an adequate value of about 8 MPa as one example, and hence the value is set to the collecting protection value. The collecting threshold value is set to, for example, 9 MPa which is higher than the collecting protection value. Moreover, the maximum value of the revolution speed of the blower 47 for the gas cooler in the present embodiment is set to 800 rpm as one example. Moreover, conditions may include a condition that predetermined time elapses after the revolution speed of the blower 47 for the gas cooler reaches the maximum value.

In consequence, in a case where the detected pressure of the unit outlet side pressure sensor 58 exceeds the collecting threshold value of 9 MPa or in a case where the detected pressure is not higher than the collecting threshold value but exceeds the collecting protection value of 8 MPa and the revolution speed of the blower 47 for the gas cooler reaches the maximum value of 800 rpm, the control device C judges that the high pressure side pressure abnormally rises owing to the excess gas refrigerant in the refrigerant circuit 1, and executes a refrigerant collecting operation.

In this refrigerant collecting operation, the control device C opens the electromotive expansion valve (the first opening/closing means) 102 and the electromagnetic valve (the second opening/closing means) 104 while the electromagnetic valve (the third opening/closing means) 106 is closed. In consequence, the high-temperature high-pressure refrigerant discharged from the compressors 11 and 11 through the high stage side discharge ports 28 thereof flows through the oil separator 44, and is cooled by the gas cooler 46, the exhaust heat recovery heat exchanger 70 and the intermediate heat exchanger 80, and a part of the refrigerant flows into the refrigerant amount regulation tank 100 via the first communicating circuit 101 provided with the opened electromotive expansion valve 102.

At this time, since the electromagnetic valve 104 is opened, the pressure in the refrigerant amount regulation tank 100 can be released to the outside of the tank via the second communicating circuit 103 which connects the upper part of the refrigerant amount regulation tank 100 to the medium pressure region of the refrigerant circuit 1. Therefore, when the outdoor temperature becomes high, for example, even when a gas cycle operation is performed so that the refrigerant in the refrigerant circuit 1 is not liquefied, the pressure in the tank 100 lowers and the refrigerant which has flowed into the tank is liquefied to accumulate in the tank 100. That is, the pressure in the refrigerant amount regulation tank 100 lowers to be not higher than the supercritical pressure, whereby the refrigerant shifts from a gas region to a saturated region, and a liquid level can be acquired.

In consequence, the refrigerant in the refrigerant circuit 1 can rapidly and efficiently be collected in the refrigerant amount regulation tank 100. Therefore, it is possible to eliminate a disadvantage that the pressure becomes an abnormally high pressure owing to the excess refrigerant in the refrigerant circuit 1 on the high pressure side and to prevent an overload operation of the compressors 11 and 11 due to the high pressure abnormality.

In particular, in a case where the upper part of the refrigerant amount regulation tank 100 is connected to the medium pressure region of the refrigerant circuit 1 via the second communicating circuit 103, unlike a case where the tank is connected to a low pressure region of the refrigerant circuit 1, it is possible to avoid deterioration of a cooling efficiency owing to the raised low pressure side pressure.

Moreover, in the present embodiment, even in a case where the high pressure side pressure detected by the unit outlet side pressure sensor 58 is not higher than the collecting threshold value, when the pressure exceeds the predetermined collecting protection value and the revolution speed of the blower 47 which air-cools the gas cooler 46 is the maximum value, the refrigerant collecting operation is performed also in consideration of the operation state of the blower 47, whereby it is possible to prevent the deterioration of the efficiency due to continuation of a state where the pressure of the refrigerant circuit 1 on the high pressure side is abnormally high.

A Refrigerant Holding Operation Will be Described as (A-2).

On the other hand, the control device C judges whether or not the high pressure side pressure detected by the unit outlet side pressure sensor 58 is the collecting protection value of 8 MPa or lower in the present embodiment. When the pressure lowers below the collecting protection value, the control device ends the refrigerant collecting operation to shift to a refrigerant holding operation. In this refrigerant holding operation, the control device C keeps the state where the electromagnetic valve (the third opening/closing means) 106 is closed, closes the electromagnetic valve (the second opening/closing means) 104, and keeps the open degree of the electromotive expansion valve (the first opening/closing means) 102 of the previous refrigerant collecting operation.

It is to be noted that the open degree of the electromotive expansion valve 102 may be set to be smaller than the open degree thereof in the refrigerant collecting operation. Consequently, the electromagnetic valve 104 can be closed to keep the liquid level in the refrigerant amount regulation tank 100 by the pressure of the high pressure region of the refrigerant circuit 1 via the opened electromotive expansion valve 102. Therefore, it is possible to avoid a liquid seal in the refrigerant amount regulation tank 100 and to acquire safety. In consequence, it is possible to keep an appropriate amount of the refrigerant to be circulated through the refrigerant circuit 1.

Moreover, the control device C sets the open degree of the electromotive expansion valve 102 in the refrigerant holding operation to be smaller than the open degree thereof in the refrigerant collecting operation, which can effectively eliminate a disadvantage that during the refrigerant holding operation, the refrigerant in the refrigerant circuit 1 is excessively collected in the refrigerant amount regulation tank 100 to cause the inadequacy of the refrigerant in the refrigerant circuit 1.

A Refrigerant Discharging Operation Will be Described as (A-3).

Moreover, the control device C judges whether the detected pressure of the unit outlet side pressure sensor 58 lowers below a predetermined discharge threshold value (about 7 MPa in the present embodiment) which is lower than the collecting protection value (about 8 MPa in this case), or whether the detected pressure of the unit outlet side pressure sensor 58 is not higher than the collecting protection value and the revolution speed of the blower 47 for the gas cooler is not higher than a predetermined standard value which is lower than the maximum value. It is to be noted that the predetermined standard value is about $3/8$ of the maximum value, i.e., about 300 rpm when the maximum value is 800 rpm as one example in the present embodiment. Moreover, conditions may include a condition that the predetermined time elapses after the revolution speed of the blower 47 for the gas cooler becomes the predetermined standard value or a lower value.

Consequently, in a case where the detected pressure of the unit outlet side pressure sensor 58 lowers below the discharge threshold value of 7 MPa, or in a case where the detected pressure is not higher than the collecting protection value of 80 MPa and the revolution speed of the blower 47 for the gas cooler is not higher than the predetermined standard value of 300 rpm in this case, the control device C judges that the refrigerant in the refrigerant circuit 1 is inadequate, and executes the refrigerant discharging operation.

In this refrigerant discharging operation, the control device C closes the electromotive expansion valve (the first opening/closing means) 102 and the electromagnetic valve (the second opening/closing means) 104, and opens the electromagnetic valve (the third opening/closing means) 106. Consequently, the liquid refrigerant accumulated in the refrigerant amount regulation tank 100 is discharged to the refrigerant circuit 1 via the third communicating circuit 105 connected to the lower part of the tank 100 and provided with the opened electromagnetic valve 106. Therefore, unlike the case where the refrigerant mixed with the gas refrigerant from the upper part of the refrigerant amount regulation tank 100 is discharged to the refrigerant circuit 1, the refrigerant in the refrigerant amount regulation tank 100 can rapidly be discharged to the refrigerant circuit 1. In consequence, it is possible to operate the refrigerating apparatus with a high efficiency.

A Refrigerant Holding Operation Will be Described as (A-4).

Afterward, the control device C judges whether the high pressure side pressure detected by the unit outlet side pressure sensor 58 is not lower than the collecting protection value of 8 MPa in the present embodiment. When the pressure exceeds the collecting protection value, the control device ends the refrigerant discharging operation to shift to the above-mentioned refrigerant holding operation. Afterward, based on the high pressure side pressure of the refrigerant circuit 1, the control device repeatedly executes the refrigerant collecting operation, the refrigerant holding operation, the refrigerant discharging operation and the refrigerant holding operation, whereby the device can control the refrigerant collection/discharge based on the high pressure side pressure, and can precisely protect the apparatus from the high pressure and prevent the overload operation. In consequence, it is possible to acquire the cooling ability of the refrigerating apparatus and obtain an adequate COP.

Especially in the present embodiment, it is possible to control the refrigerant collecting/discharging operation in consideration of not only the high pressure side pressure but also the revolution speed of the blower 47 which air-cools the gas cooler 46, and it is possible to prevent the deterioration of the efficiency due to the continuation of the state where the pressure of the refrigerant circuit 1 on the high pressure side is abnormally high.

Moreover, in the present embodiment, both the second communicating circuit 103 and the third communicating circuit 105 are connected to the intercooler 38 on the outlet side thereof in the refrigerant circuit 1. In consequence, a pressure drop in the intercooler 38 can be prevented to smoothly discharge the refrigerant from the refrigerant amount regulation tank 100 to the refrigerant circuit 1.

It is to be noted that when the compressors 11 and 11 stop their operations, the control device C executes the refrigerant discharging operation. In consequence, it is possible to eliminate a disadvantage that at the start of the compressors 11 and 11, the amount of the refrigerant in the refrigerant circuit 1 becomes inadequate, which can realize an appropriate high pressure side pressure in accordance with the high pressure side pressure of the compressor 11 to be operated.

Moreover, in this case, as the compressor 11 (the compression means), a two-stage compression type rotary compressor is employed in which the first and second compression elements 18 and 20 and the electromotive element 14 are incorporated in the sealed container 12, but two single-stage rotary compressors may be employed. Alternatively, another type of compressor may be employed in which a refrigerant is taken from or introduced into a medium pressure portion.

A Split Cycle Will be Described as (B).

Next, a split cycle of the refrigerating apparatus R in the present embodiment will be described. In the refrigerating apparatus R of the present embodiment, a refrigerating cycle is constituted of the first rotary compression elements (the low stage side) 18 of the compressors 11 and 11, the intercooler 38, a joining unit 81 as a joining device which joins two fluid flows, the second rotary compression elements (the high stage side) 20 of the compressors 11 and 11, the oil separator 44, the gas cooler 46, a branching unit 82, auxiliary reducing means (an auxiliary expansion valve) 83, the intermediate heat exchanger 80, the main reducing means (the main expansion valves) 62A and 62B and the evaporators 63A and 63B.

The branching unit 82 is a branching device which branches the refrigerant exiting from the gas cooler 46 into two flows. That is, the branching unit 82 of the present embodiment branches the refrigerant exiting from the gas cooler 46 into the first refrigerant flow and the second refrigerant flow, passes the first refrigerant flow through an auxiliary circuit and passes the second refrigerant flow through a main circuit.

The main circuit in FIG. 1 is an annular refrigerant circuit constituted of the first rotary compression element 18, the intercooler 38, the joining unit 81, the second rotary compression element 20, the gas cooler 46, the branching unit 82, a second flow path 80B of the intermediate heat exchanger 80, the main reducing means 62A and 62B and the evaporators 63A and 63B, and the auxiliary circuit is a circuit successively extending from the branching unit 82 to the joining unit 81 through the auxiliary reducing means 83 and a first flow path 80A of the intermediate heat exchanger 80.

The auxiliary reducing means 83 reduces the pressure of the first refrigerant flow branched by the branching unit 82 and passing through the auxiliary circuit. The intermediate heat exchanger 80 performs heat exchange between the first refrigerant flow of the auxiliary circuit having the pressure thereof reduced by the auxiliary reducing means 83 and the second refrigerant flow branched by the branching unit 82. The intermediate heat exchanger 80 is provided with the second flow path 80B through which the second refrigerant flow passes and the first flow path 80A through which the first refrigerant flow passes in such a relation as to perform the heat exchange. When the second refrigerant flow passes through the second flow path 80B of the intermediate heat exchanger 80, the flow is cooled by the first refrigerant flow passing through the first flow path 80A, whereby it is possible to decrease a specific enthalpy in the evaporators 63A and 63B.

As shown in FIG. 2, on the input side of the control device C, the device is connected to the discharge temperature sensors (the discharge temperature detection means) 50, the unit outlet side pressure sensor (the unit outlet side pressure detection means) 58, a medium pressure sensor (medium pressure detection means) 49, a low pressure sensor (suction pressure detection means) 32, a gas cooler outlet temperature sensor (gas cooler outlet temperature detection means) 52, a unit outlet temperature sensor (unit outlet temperature detection means) 54 and a unit inlet temperature sensor (inlet temperature detection means) 34.

The discharge temperature sensors 50 are disposed at the high stage side discharge ports 28 of the compressors 11 and 11 to detect the discharge temperature of the refrigerant discharged from the second rotary compression elements 20. The unit outlet side pressure sensor 58 is disposed on the downstream side of the refrigerant amount regulation tank 100 to detect the pressure of the refrigerant flowing toward the showcase units 5A and 5B. The low pressure sensor 32 is disposed in the refrigerant piping line 9 connected to the low stage side suction ports 22 and 22 of the compressors 11 and 11 on the low pressure side of the refrigerant circuit 1, i.e., on the downstream side of the evaporators 63A and 63B in the present embodiment, to detect the suction pressure of the refrigerant flowing toward the refrigerant introduction tube 30. The medium pressure sensor 49 is disposed in the medium pressure region of the refrigerant circuit 1, i.e., the auxiliary circuit of the split cycle in the present embodiment, to detect the pressure of the first refrigerant flow passed through the first flow path 80A of the intermediate heat exchanger 80.

The gas cooler outlet temperature sensor 52 is disposed on the outlet side of the gas cooler 46, to detect the temperature (GCT) of the refrigerant exiting from the gas cooler 46. The unit outlet temperature sensor 54 is disposed on the outlet side of the intermediate heat exchanger 80 connected to the refrigerant piping line 7, to detect a unit outlet temperature (LT). The unit inlet temperature sensor 34 is disposed in the refrigerant piping line 9 connected to the low stage side suction ports 22 of the compressors 11, to detect the suction temperature of the refrigerant flowing toward the refrigerant introduction tube 30. Moreover, the control device on the outlet side is connected to the auxiliary reducing means 83 constituting the split cycle. The auxiliary reducing means 83 has an open degree thereof controlled by a step motor.

Hereinafter, the open degree control of the auxiliary reducing means 83 will be described in detail. At the start of the operation of the compressors 11, the auxiliary reducing means 83 has a predetermined initial valve open degree. Afterward, the control device C determines such an operation amount as to increase the valve open degree of the auxiliary reducing means 83 based on a first control amount, a second control amount and a third control amount as follows.

A Valve Open Degree Increase Control of Auxiliary Reducing Means Will be Described as (B-1).

The first control amount (DTcont) is obtained based on a discharged refrigerant temperature DT of the compressor 11. The control device C judges whether or not the temperature DT detected by the discharge temperature sensor 50 is higher than a predetermined value DT0. When the discharged refrigerant temperature DT is higher than the predetermined value DT0, the control amount is exerted in such a direction as to increase the open degree of the auxiliary reducing means 83. The predetermined value DT0 is a temperature (e.g., +95° C.) which is slightly lower than a limit temperature (e.g., +100° C.) which can realize an adequate operation of the compressor 11. When the temperature rises, the open degree of the auxiliary reducing means 83 is increased to suppress the temperature rise of the compressor 11, thereby executing control so that the compressor 11 does not reach the limit temperature.

The second control amount (MPcont) is a control amount for regulating the amount of the refrigerant to be circulated through the auxiliary circuit of the split cycle to obtain an adequate medium pressure (MP). In the present embodiment, it is judged whether or not the pressure MP of the medium pressure region of the refrigerant circuit 1 detected by the medium pressure sensor 49 is higher than the adequate medium pressure value calculated (obtained) from the high pressure side pressure HP of the refrigerant circuit 1 detected by the unit outlet side pressure sensor 58 and the low pressure side pressure LP of the refrigerant circuit 1 detected by the low pressure sensor 32. When the pressure MP of the medium pressure region is lower than the adequate medium pressure value, the control amount is exerted in such a direction as to increase the open degree of the auxiliary reducing means 83.

It is to be noted that the adequate medium pressure value may be calculated from a geometric average of the detected high pressure side pressure HP and the low pressure side pressure LP. Alternatively, the adequate medium pressure value may experimentally be obtained from the high pressure side pressure HP and the low pressure side pressure LP in advance, to determine the adequate medium pressure value from a data table constructed based on this experimentally obtained value.

Moreover, in the present embodiment, the adequate medium pressure value obtained from the high pressure side pressure HP and the low pressure side pressure LP is compared with the pressure MP of the medium pressure region to determine the second control amount (MPcont), but the present invention is not limited to this embodiment and, for example, another value may be employed as follows. That is, an over-compression judgment value MPO is obtained from the pressure MP of the medium pressure region of the refrigerant circuit 1 detected by the medium pressure sensor 49 and the low pressure side pressure LP of the refrigerant circuit 1 detected by the low pressure sensor 32, and it is judged whether or not the over-compression judgment value MPO is lower than the high pressure side pressure HP of the refrigerant circuit 1 detected by the unit outlet side pressure sensor 58. When the over-compression judgment value MPO is lower than the high pressure side pressure HP, the control amount is exerted in such a direction as to increase the open degree of the auxiliary reducing means 83. The second control amount can be reflected in the control of the open degree of the auxiliary reducing means 83 to keep adequate pressure differences among the high pressure side pressure HP, the pressure MP of the medium pressure region and the low pressure side pressure LP, which can stabilize the operation of the refrigerating cycle.

The third control amount (SPcont) is a control amount for obtaining an adequate temperature LT of the refrigerant exiting from the second flow path of the intermediate heat exchanger 80. In the present embodiment, the control device C judges whether or not a difference (GCT-LT) between the temperature GCT of the refrigerant passed through the gas cooler 46 and detected by the gas cooler outlet temperature sensor 52 and the temperature LT of the second refrigerant flow passed through the intermediate heat exchanger 80 and detected by the unit outlet temperature sensor 54 is smaller than a predetermined value SP. When the difference is smaller than the predetermined value, the control amount is exerted in such a direction as to increase the open degree of the auxiliary reducing means 83.

Here, the predetermined value SP in a case where the high pressure side pressure HP is in a supercritical range of the refrigerant is different from that in a case where the pressure is in a saturated range. In the present embodiment, it is judged based on the outdoor temperature detected by the outdoor temperature sensor 56 whether the high pressure side pressure HP is in the supercritical range or the saturated range. When the outdoor temperature is high, for example, +31° C. or higher, it is judged that the pressure is in the supercritical range. When the outdoor temperature is low, for example, lower than +31° C., it is judged that the pressure is in the saturated range. Moreover, when it is judged that the pressure is in the supercritical range, the predetermined value SP is increased. When it is judged that the pressure is in the saturated range, the predetermined value SP is decreased. In the present embodiment, the predetermined value SP is set to 35° C. in the supercritical range, and set to 20° C. in the saturated range.

The control device C adds up the three control amounts obtained as described above, i.e., the first control amount (DTcont), the second control amount (MPcont) and the third control amount (SPcont) to determine the operation amount of the valve open degree of the auxiliary reducing means 83, and increases the valve open degree based on this amount.

A Valve Open Degree Decrease Control of Auxiliary Reducing Means Will be Described as (B-2).

Moreover, the control device C determines the operation amount for decreasing the valve open degree of the auxiliary reducing means 83 from the temperature LT of the second refrigerant flow passed through the intermediate heat exchanger 80 or a difference between the discharged refrigerant temperature DT from the compressor 11 and the temperature GCT of the refrigerant passed through the gas cooler 46.

That is, the control device C judges whether or not the temperature LT of the second refrigerant flow passed through the intermediate heat exchanger 80 and detected by the unit outlet temperature sensor 54 is lower than a predetermined value. In the present embodiment, the predetermined value is 0° C. as one example. In consequence, when the unit outlet temperature is 0° C. or lower, the operation is performed in such a direction as to decrease the open degree of the auxiliary reducing means 83, and it is possible to eliminate a disadvantage that the second refrigerant flow cooled in the intermediate heat exchanger 80 is excessively cooled.

Moreover, the control device C judges whether or not a difference (DT-GCT) between the temperature DT detected by the discharge temperature sensor 50 and the temperature GCT of the refrigerant discharged from the gas cooler 46 and detected by the gas cooler outlet temperature sensor 52 is lower than a predetermined value TDT. When the difference is smaller than the predetermined value, the control amount is exerted in such a direction as to decrease the open degree of the auxiliary reducing means 83.

Here, the predetermined value TDT in a case where the high pressure side pressure HP is in the supercritical range of the refrigerant is different from that in a case where the pressure is in the saturated range. In the present embodiment, it is judged based on the outdoor temperature whether the high pressure side pressure HP is in the supercritical range or the saturated range in the same manner as in a case where the third control amount is obtained. Moreover, when it is judged that the pressure is in the supercritical range, the predetermined value TDT is decreased. When it is judged that the pressure is in the saturated range, the predetermined value TDT is increased. In the present embodiment, the predetermined value TDT is set to 10° C. in the supercritical range and set to 35° C. in the saturated range.

When the temperature LT of the second refrigerant flow passed through the intermediate heat exchanger 80 is not higher than the predetermined value (0° C.) or when the difference between the discharged refrigerant temperature DT from the compressor 11 and the temperature GCT of the refrigerant discharged from the gas cooler 46 is smaller than the predetermined value TDT, the control device C determines the operation amount of the valve open degree of the auxiliary reducing means 83, and decreases the valve open degree based on this operation amount regardless of the above valve open degree increase control.

The refrigerating apparatus R of the present embodiment having the above split cycle can branch the refrigerant which has released heat in the gas cooler 46 to cool the second refrigerant flow by the first refrigerant flow having a pressure thereof reduced by the auxiliary reducing means 83 and expanded, whereby it is possible to decrease the specific enthalpy at inlets of the evaporators 63A and 63B. In consequence, it is possible to improve a refrigerating effect and to effectively enhance a performance as compared with a conventional apparatus. Moreover, the branched first refrigerant flow is returned to the second rotary compression element 20 (a medium pressure portion) through the high stage side suction port 26 of the compressor 11, whereby the amount of the second refrigerant flow sucked into the first rotary compression element 18 (a low pressure portion) through the low stage side suction port 22 of the compressor 11 decreases. A compression work amount in the first rotary compression element 18 (a low stage portion) for compression from the low pressure to the medium pressure decreases. Consequently, a compression power in the compressor 11 lowers to improve the coefficient of performance.

Here, the effect of the above so-called split cycle depends on the amount of the first and second refrigerant flows passing through the intermediate heat exchanger 80. That is, when the amount of the first refrigerant flow is excessively large, the amount of the second refrigerant flow to be finally evaporated in the evaporators 63A and 63B becomes inadequate. Conversely, when the amount of the first refrigerant flow is excessively small, the effect of the split cycle diminishes. On the other hand, the pressure of the first refrigerant flow reduced by the auxiliary reducing means 83 is the medium pressure of the refrigerant circuit 1, and the medium pressure is controlled to control the amount of the first refrigerant flow.

Here, in the present embodiment, as described above, the control device calculates the first control amount exerted in such a direction as to increase the open degree of the auxiliary reducing means 83 in a case where the temperature DT of the refrigerant discharged from the compressor 11 (the discharge temperature sensor 50) is higher than the predetermined value DT0, the second control amount exerted in such a direction as to increase the open degree of the auxiliary reducing means 83 in a case where the pressure MP of the medium pressure region of the refrigerant circuit 1 is lower than the adequate medium pressure value obtained from the high pressure side pressure HP and the low pressure side pressure LP of the refrigerant circuit 1, and the third control amount exerted in such a direction as to increase the open degree of the auxiliary reducing means 83 in a case where the difference (GCT-LT) between the temperature GCT of the refrigerant discharged from the gas cooler 46 and the temperature LT of the second refrigerant flow passed through the intermediate heat exchanger 80 is smaller than the predetermined value SP. The control device adds up these first to third control amounts to determine the operation amount for increasing the valve open degree of the auxiliary reducing means 83. Moreover, when the temperature LT is lower than the predetermined value or the temperature DT-GCT is lower than the predetermined value TDT, the operation amount is determined in such a direction as to decrease the valve open degree of the auxiliary reducing means 83.

In consequence, the temperature DT of the discharged refrigerant can be kept to be not higher than the predetermined value DT0 by the first control amount, and the medium pressure MP of the refrigerant circuit 1 can be kept to be adequate by the second control amount, whereby the pressure differences among the low pressure side pressure LP, the medium pressure MP and the high pressure side pressure HP can adequately be kept. Moreover, the temperature LT of the second refrigerant flow passed through the intermediate heat exchanger 80 can be lowered to keep a refrigerating effect by the third control amount. In consequence, it is generally possible to increase the efficiency of the refrigerating apparatus and to stabilize the apparatus.

Moreover, the control device C increases the predetermined value SP and decreases the predetermined value TDT when the high pressure side pressure HP is in the supercritical range, and decreases the predetermined value SP and increases the predetermined value TDT when the high pressure side pressure HP is in the saturated range, whereby the control device can vary the predetermined values SP and TDT of the third and first control amounts to separately control the case where the high pressure side pressure HP is in the supercritical range and the case where the pressure is in the saturated range.

In consequence, even when the high pressure side pressure HP is in the saturated range, a superheat degree in the intermediate heat exchanger 80 can securely be acquired, thereby avoiding a disadvantage that a liquid backflow occurs in the compressor 11. Moreover, when the high pressure side pressure HP is in the supercritical range, such a liquid backflow does not occur, and the value can be set in favor of the efficiency.

It is to be noted that as the second control amount in the above embodiment, there is used the second control amount exerted in such a direction as to increase the open degree of the auxiliary reducing means in a case where the over-compression judgment value MPO obtained from the pressure MP of the medium pressure region and the low pressure side pressure LP of the refrigerant circuit 1 is smaller than the high pressure side pressure HP of the refrigerant circuit. The first to third control amounts are added up to determine the operation amount of the valve open degree of the auxiliary reducing means. Even in this case, the adequate medium pressure MP of the refrigerant circuit can be obtained in the same manner as described above, thereby adequately keeping the pressure differences among the low pressure side pressure LP, the medium pressure MP and the high pressure side pressure HP.

Moreover, the first refrigerant flow exiting from the intermediate heat exchanger 80 in the present embodiment can be returned to the intercooler 38 on the outlet side by the joining unit 81 disposed on the outlet side of the intercooler 38, whereby the pressure drop in the intercooler 38 can be prevented to smoothly join the refrigerant flow exiting from the intermediate heat exchanger 80 on the medium pressure side of the refrigerant circuit 1.

An Exhaust Heat Recovery Heat Exchanger Will be Described as (C).

Next, the exhaust heat recovery heat exchanger 70 employed in the refrigerating apparatus R of the present embodiment will be described. The exhaust heat recovery heat exchanger 70 in the present embodiment performs heat exchange between the second refrigerant flow passed through the gas cooler 46 and branched by the branching unit 82 and the carbon dioxide refrigerant (an exhaust heat recovery medium) of a heat pump unit constituting a hot water supply device (not shown). The hot water supply device in the present embodiment comprises the heat pump unit (not shown) including a refrigerant circuit in which a refrigerant compressor, a hydrothermal exchanger, a pressure reducing unit and an evaporator are annularly connected via a refrigerant piping line; and a water circuit in which water in a hot water tank is heated by the hydrothermal exchanger and then returned to the hot water tank, and the evaporator of the heat pump unit comprises an exhaust heat recovery medium flow path 70B of the exhaust heat recovery heat exchanger 70. Consequently, in the exhaust heat recovery heat exchanger 70, a refrigerant flow path 70A through which the second refrigerant flow passes in the above split cycle and the exhaust heat recovery medium flow path 70B are disposed in such a relation that, the heat exchange can be performed. When the refrigerant of the heat pump unit flowing through the exhaust heat recovery medium flow path 70B of the exhaust heat recovery heat exchanger 70 passes, the second refrigerant flow passed through the gas cooler 46 is cooled in the refrigerant flow path 70A.

Here, in the present embodiment, the second refrigerant flow exiting from the gas cooler 46 before entering the intermediate heat exchanger 80 constituting the above split cycle is passed through the refrigerant flow path 70A of the exhaust heat recovery heat exchanger 70. Here, the outdoor temperature has little influence, and the exhaust heat of the refrigerant flowing through the refrigerant flow path 70A of the exhaust heat recovery heat exchanger 70 can efficiently be collected and utilized to heat the refrigerant flowing through the exhaust heat recovery medium flow path 70B constituting the hot water supply device, which enables efficient generation of hot water.

Moreover, the refrigerating apparatus is configured to pass, through the exhaust heat recovery heat exchanger 70, the second refrigerant flow exiting from the gas cooler 46 before entering the intermediate heat exchanger 80. Therefore, when a hot water generation side (a hot water supply device side) is more utilized, the refrigerant temperature of the second refrigerant flow passing through the intermediate heat exchanger 80 can be lowered, whereby the refrigerant amount of the first refrigerant flow passing through the intermediate heat exchanger 80 can be decreased. In consequence, the amount of the refrigerant flowing through the second refrigerant flow can be increased, and the evaporation amount of the refrigerant in the evaporators 63A and 63B can be increased to improve the efficiency of the refrigerating cycle.

In particular, when carbon dioxide is used as the refrigerant as in the present embodiment, the refrigerating ability can effectively be improved, and the performance can be enhanced.

Moreover, in the refrigerating apparatus R of the present embodiment, a gas cooler bypass circuit 71 which bypasses the gas cooler 46 may be disposed. In this case, the gas cooler bypass circuit 71 is provided with an electromagnetic valve 72, and the electromagnetic valve (a valve device) 72 is controlled to open and close by the control device C described above.

In consequence, when the amount of the refrigerant used in the hot water supply device is large and the refrigerant flowing through the exhaust heat recovery medium flow path 70B (the evaporator) of the heat pump unit cannot sufficiently be evaporated, the control device C opens the electromagnetic valve 72 and allows a part of a high-temperature refrigerant flowing into the gas cooler 46 to flow into the gas cooler bypass circuit 71, so that the high-temperature refrigerant may flow through the refrigerant flow path 70A of the exhaust heat recovery heat exchanger 70 as it is. Thus, it is possible to compensate for the temperature on the hot water supply device side by effectively using the exhaust heat.

A Control of Blower for Gas Cooler Will be Described as (D).

Next, control of the blower 47 for the gas cooler which air-cools the gas cooler 46 as described above will be described. The control device C in the present embodiment is connected to the high pressure sensors (the high pressure detection means) 48 and 48, the low pressure sensor 32 and the outdoor temperature sensor 56 on the input side as shown in FIG. 2. Here, the pressure detected by the low pressure sensor 32 and an evaporation temperature TE in the evaporators 63A and 63B have a constant relation, whereby the control device C converts and acquires the evaporation temperature TE of the refrigerant in the evaporators 63A and 63B by use of the pressure detected by the low pressure sensor 32. Moreover, the control device C on the outlet side is connected to the blower 47 for the gas cooler which air-cools the gas cooler 46.

The control device C controls the revolution speed of the blower 47 for the gas cooler so that the high pressure side pressure HP detected by the high pressure sensor 48 reaches a predetermined target value (a target high pressure: THP). Here, the target high pressure THP is determined from an outdoor temperature TA and the evaporation temperature TE of the refrigerant in the evaporators 63A and 63B.

In the refrigerating apparatus R where a pressure which is not lower than the supercritical pressure is obtained on the high pressure side of the refrigerant circuit 1 as in the present embodiment, when the outdoor temperature TA is a certain temperature, for example, +30° C. or lower, a saturation cycle is performed, and at a temperature which is higher than +30° C., a gas cycle is performed. When the gas cycle is performed, the refrigerant is not liquefied, and hence the temperature or the pressure is not uniquely determined by the amount of the refrigerant in the refrigerant circuit 1 at this time. Therefore, the target high pressure THP varies with the outdoor temperature TA.

In the present embodiment, as one example, when the outdoor temperature TA detected by the outdoor temperature sensor 56 is not higher than a lower limit temperature (e.g., 0° C.), the target high pressure THP is constantly a predetermined lower limit value THPL. Moreover, when the outdoor temperature TA is not lower than a predetermined temperature (an upper limit temperature) which is higher than 30° C., the target high pressure THP is constantly a predetermined upper limit value THPH. Furthermore, when the outdoor temperature TA is higher than the lower limit temperature and lower than the upper limit temperature, the target high pressure THP is obtained as follows.

Figure 3:
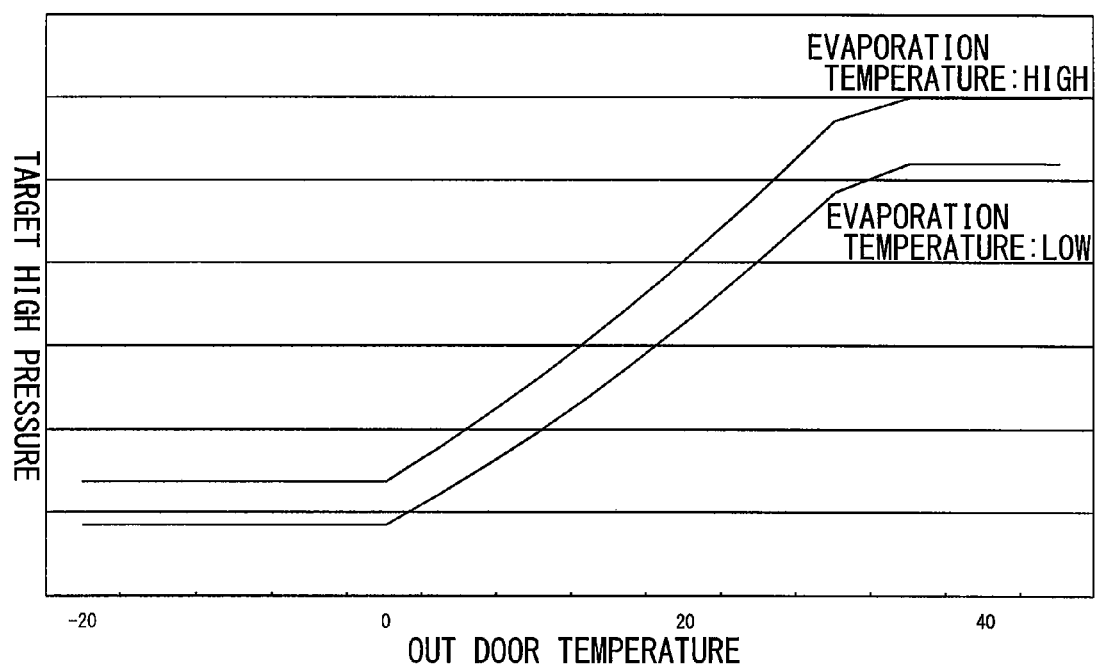
FIG. 3 is a diagram showing a tendency of a target high pressure HPT determined from an outdoor temperature and an evaporation temperature.

As the outdoor temperature TA becomes lower than a predetermined reference temperature of, for example, +30° C., the target value THP of the high pressure side pressure is determined in such a direction as to lower the value. As the outside temperature becomes higher, the target value THP is determined in such a direction as to raise the value. Moreover, as the evaporation temperature TE of the refrigerant in the evaporators 63A and 63B converted and acquired by use of the pressure detected by the low pressure sensor 32 as described above becomes higher than the predetermined reference temperature, the target value THP of the high pressure side pressure is determined in such a direction as to raise the value. As the evaporation temperature becomes lower, the target value THP is determined in such a direction as to lower the value. FIG. 3 is a diagram showing a tendency of the target high pressure THP determined from the outdoor temperature TA and the evaporation temperature TE.

It is to be noted that in the present embodiment, the control device C calculates the target high pressure THP from the outdoor temperature TA and the evaporation temperature TE by use of a calculation formula, but the present invention is not limited to this embodiment, and the target high pressure THP may be acquired based on a data table beforehand obtained from the outdoor temperature TA and the evaporation temperature TE.

Moreover, the control device C executes proportional differential calculation from P (proportional control in such a direction as to decrease a difference e in proportion to the size of the difference e) and D (differential control in such a direction as to decrease the variance of the difference e) based on the high pressure side pressure HP detected by the high pressure sensor (high pressure detection means) 48, the target high pressure THP and the difference e between HP and THP, to determine the revolution speed of the blower 47 for the gas cooler obtained as the operation amount. As to the revolution speed, as the target high pressure THP becomes higher, the revolution speed of the blower 47 is raised. As the target high pressure THP becomes lower, the revolution speed of the blower 47 is lowered.

Consequently, the control device C controls the revolution speed of the blower 47 for the gas cooler based on the outdoor temperature TA and the evaporation temperature TE (converted and acquired from the low pressure detected by the low pressure sensor 32) of the refrigerant in the evaporator, to obtain the supercritical pressure on the high pressure side. Even in this refrigerating apparatus R, the control device can control the blower 47 for the gas cooler so as to obtain an appropriate high pressure. In consequence, it is possible to realize a highly efficient operation while decreasing noises of the operation of the blower 47 for the gas cooler.

In the present embodiment, the control device C determines the target value THP of the high pressure side pressure of the refrigerant circuit 1 based on the outdoor temperature TA and the evaporation temperature TE, for example, in such a direction that as the outdoor temperature TA becomes lower, the target value THP is lowered, and as the evaporation temperature TE becomes higher, the target value THP is raised. The control device controls the blower 47 for the gas cooler so as to obtain the target pressure value THP on the high pressure side, whereby it is possible to consider the state of the refrigerant which changes to the saturation cycle and the gas cycle in accordance with the outdoor temperature TA and realize a preferable high pressure side pressure based on the evaporation temperature TE, thereby realizing the highly efficient operation. In this way, the present invention is especially effective in the supercritical refrigerant circuit (the supercritical refrigerating cycle) in which carbon dioxide is used as the refrigerant.

An Oil Separator Will be Described as (E).

On the other hand, the high pressure discharge piping line 42 which connects the high stage side discharge port 28 of the compressor 11 to the gas cooler 46 as described above is provided with the oil separator 44. The oil separator 44 separates oil from the refrigerant to capture the oil included in the high-pressure refrigerant discharged from the compressor 11, and the oil separator 44 is connected to an oil return circuit 73 which returns the captured oil to the compressor 11. In the oil return circuit 73, the oil cooler 74 which cools the captured oil is disposed, and on the downstream side of the oil cooler 74, the oil return circuit 73 is branched into two systems which are connected to the sealed containers 12 of the compressors 11 via strainers 75 and flow rate regulation valves (electromotive valves) 76, respectively. Since the medium pressure is kept in the sealed container 12 of the compressor 11 as described above, the captured oil is returned into the sealed container 12 owing to a differential pressure between the high pressure in the oil separator 44 and the medium pressure in the sealed container 12. Moreover, the sealed container 12 of the compressor 11 is provided with an oil level sensor 77 which detects the level of the oil held in the sealed container 12.

Moreover, the oil return circuit 73 is provided with an oil bypass circuit 78 which bypasses the oil cooler 74, and the oil bypass circuit 78 is provided with an electromagnetic valve (a valve device) 79. The electromagnetic valve 79 is controlled to open and close by the control device C as described above. Furthermore, as described above, the oil cooler 74 is installed in the same air path 45 of the gas cooler 46, and is air-cooled by the blower 47 for the gas cooler.

According to the above constitution, the control device C judges whether the temperature detected by the outdoor temperature sensor 56 disposed in the air path 45 is not higher than a predetermined oil low temperature (a predetermined value). When the temperature is above the oil low temperature, the control device closes the electromagnetic valve 79 of the oil bypass circuit 78.

In consequence, the high-temperature high-pressure refrigerants discharged from the high stage side discharge ports 28 of the compressors 11 and 11 join each other on the downstream side of the second rotary compression elements 20 and 20, and are connected to the refrigerator units 3 and 3 via the oil separator 44, the gas cooler 46 and the like. The oil included in the high-temperature high-pressure refrigerant which has flowed into the oil separator 44 is captured separately from the refrigerant here. Moreover, since the medium pressure is held in the sealed container 12 of the compressor 11, the captured oil is returned to the compressor 11 via the oil return circuit 73 owing to the differential pressure between the high pressure in the oil separator 44 and the medium pressure in the sealed container 12.

The oil which has flowed into the oil return circuit 73 is air-cooled in the oil cooler 74 disposed in the same air path 45 of the gas cooler 46 by the operation of the blower 47. The oil flows through the oil cooler 74, and is separated into two systems to return to the compressor 11 via the strainer 75 and the flow rate regulation valve 76. In consequence, the oil having the high temperature is cooled together with the high-temperature refrigerant by the oil cooler 74 to return to the compressor 11, which can suppress the rise of the temperature of the compressor 11.

On the other hand, when the temperature detected by the outdoor temperature sensor 56 is not higher than a predetermined oil lower limit temperature (a predetermined value), the control device C opens the electromagnetic valve 79 of the oil bypass circuit 78. In consequence, the oil separated from the refrigerant by the oil separator 44 does not flow through the oil cooler 74, and returns to the compressors 11 and 11 via the oil bypass circuit 78 of the oil return circuit 73. It is to be noted that when the temperature detected by the outdoor temperature sensor 56 reaches an oil upper limit temperature which is higher than the oil lower limit temperature as much as a predetermined temperature, the control device C closes the electromagnetic valve 79.

In consequence, even when the oil temperature lowers due to the lowering of the outdoor temperature and an oil viscosity increases, the electromagnetic valve 79 can be opened to return the oil from the oil separator 44 to the compressor 11 via the oil bypass circuit 78 so that the oil does not flow through the oil cooler 74. This can smoothen the return of the oil to the compressor 11.

Especially in the present embodiment, the oil cooler 74 is installed in the same air path 45 of the gas cooler 46 and the blower 47 is controlled irrespective of the temperature of the oil cooler 74 as described above, whereby the temperature of the oil cooler 74 lowers more than necessary by the operation of the blower 47, and the refrigerant is easily dissolved in the oil. However, the control device C can open the electromagnetic valve 79 of the oil bypass circuit 78 to smoothly return the oil from the oil separator 44 to the compressor 11 via the oil bypass circuit 78 so that the oil does not flow through the oil cooler 74. In consequence, especially when an air-cool amount cannot be regulated, the control can effectively be simplified.

Moreover, when the outdoor temperature is lower than the predetermined oil lower limit temperature (the predetermined value), the control device C opens the flow path of the oil bypass circuit 78 by the electromagnetic valve 79, which can prevent the refrigerant from being dissolved in the oil and increasing the viscosity thereof. It is possible to precisely return the oil from the oil separator 44 to the compressor 11 via the oil bypass circuit 78 which bypasses the oil cooler 74.

It is to be noted that in the present embodiment, the electromagnetic valve 79 is controlled to open and close based on the temperature detected by the outdoor temperature sensor 56 disposed in the air path 45, but the present invention is not limited to this embodiment, and, for example, means for detecting the temperature of the oil separator 44 may be disposed to open the flow path of the oil bypass circuit 78 by the electromagnetic valve 79 in a case where the temperature detected by the temperature detection means is lower than a predetermined value. Also in this case, it is possible to precisely prevent the refrigerant from being dissolved in the oil and increasing the viscosity thereof and to return the oil from the oil separator 44 to the compressor 11 via the oil bypass circuit 78 which bypasses the oil cooler 74.

It is to be noted that when carbon dioxide is used as the refrigerant as in the present embodiment, the control can be performed as described above to smoothly return the oil to the compressor 11. Moreover, it is possible to effectively improve the refrigerating ability and to enhance the performance.

An Improvement of Start Properties of Compressor Will be Described as (F).

Next, improving control of start properties of the compressor 11 will be described. As shown in FIG. 2, a bypass circuit 84 is disposed so that the medium pressure region of the refrigerant circuit 1 on the outlet side of the intercooler 38 of the refrigerating apparatus R described above, i.e., the second or third communicating circuit 103 or 105 connected to the intercooler 38 on the outlet side in the present embodiment is connected to the refrigerant circuit 1 on the low pressure side, i.e., the evaporators 63A and 63B on the refrigerant outlet side in the present embodiment. The bypass circuit 84 is provided with an electromagnetic valve (a valve device) 85. Moreover, the control device C is connected to the compressors 11 and 11 and the electromagnetic valve 85 as shown in FIG. 2. The control device C can detect (acquire) the operation frequency of the compressor 11.

An improving control operation of the start properties of the compressor 11 having the above constitution will be described. As described above, while the compressor 11 is operated, the low-pressure refrigerant gas sucked into the low pressure portion of the first rotary compression element 18 through the low stage side suction port 22 has a pressure thereof raised to the medium pressure by the first rotary compression element 18, and is discharged into the sealed container 12. The medium-pressure refrigerant gas in the sealed container 12 is discharged to the medium pressure discharge piping line 36 through the low stage side discharge port 24 of the compressor 11, and sucked into the compressor through the high stage side suction port 26 via the medium pressure suction tube 40 connected to the intercooler 38. A region where the refrigerant gas is discharged from the first rotary compression element 18 and sucked into the second rotary compression element 20 through the high stage side suction port 26 is the medium pressure region.

The medium-pressure refrigerant gas sucked into the medium pressure portion of the second rotary compression element 20 through the high stage side suction port 26 is subjected to second-stage compression by the second rotary compression element 20, to obtain the high-temperature high-pressure refrigerant gas. The gas is discharged to the high pressure discharge piping line 42 through the high stage side discharge port 28, whereby a region including the oil separator 44, the gas cooler 46, the exhaust heat recovery heat exchanger 70, the intermediate heat exchanger 80, the refrigerant piping line 7 and the main reducing means 62A and 62B of the showcase units 5A and 5B is disposed on the high pressure side.

Subsequently, the refrigerant gas has a pressure thereof reduced and is expanded by the main reducing means 62A and 62B, whereby a region including the evaporators 63A and 63B on the downstream side of the main reducing means and the low stage side suction port 22 connected to the first rotary compression element 18 is disposed on the low pressure side of the refrigerant circuit 1.

To restart the compressor 11 after stopping the operation of the compressor 11, the control device C opens the electromagnetic valve 85 to open the flow path of the bypass circuit 84, when the frequency rises to a predetermined operation frequency at the start of the compressor 11. The predetermined operation frequency enables effective torque control of the compressor 11, i.e., 35 Hz as one example in the present embodiment.

In consequence, when the frequency rises to the predetermined operation frequency at the start of the stopped compressor 11, the electromagnetic valve 85 is opened to raise the pressure of the refrigerant to the medium pressure by the first rotary compression element 18. The refrigerant discharged to the medium pressure discharge piping line 36 through the low stage side discharge port 24 flows through the intercooler 38, and the refrigerant of the medium pressure region flows into the low pressure region of the refrigerant circuit 1 via the bypass circuit 84. In consequence, the pressures of the medium and low pressure regions of the refrigerant circuit 1 are equalized.

Consequently, while the compressor 11 is started to raise the frequency to the predetermined operation frequency, a predetermined torque cannot be acquired, but during this start, the pressures of the medium and low pressure regions can be equalized to eliminate a disadvantage that the medium pressure comes close to the high pressure, even when the medium pressure easily becomes high owing to the high outdoor temperature.

Therefore, it is possible to beforehand avoid a start defect due to the pressure of the medium pressure region coming close to the pressure of the high pressure region while torque inadequacy occurs at the start of the compressor 11, and it is possible to realize a stable and highly efficient operation. It is to be noted that after the detected operation frequency of the compressor 11 rises to the predetermined operation frequency, the control device C closes the electromagnetic valve 85 to close the flow path of the bypass circuit 84, thereby performing a usual refrigerating cycle as described above.

An Improvement of Start Properties of Compressor Will be Described as (G).

Figure 4:
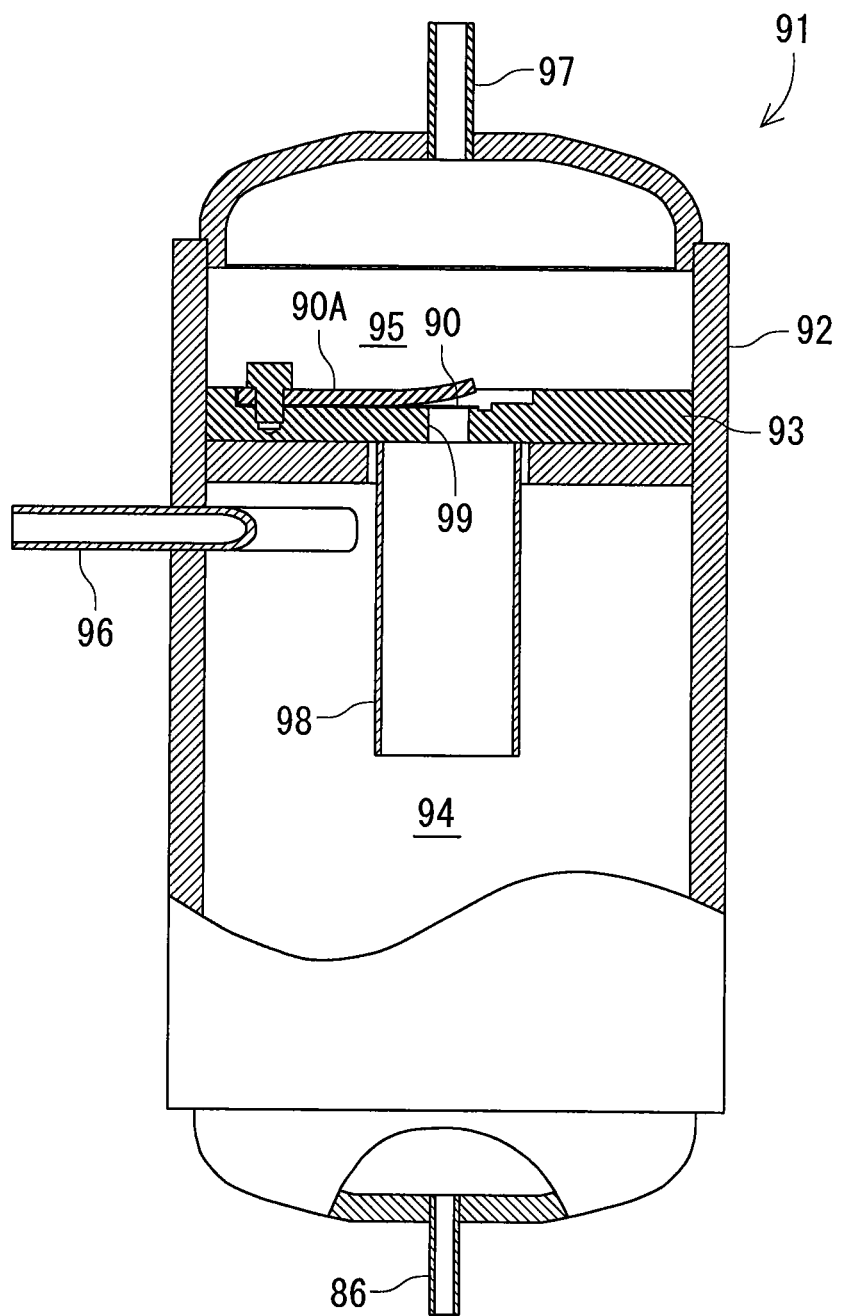
FIG. 4 is a partially sectional vertical side view of a refrigerant regulator of the refrigerating apparatus of FIG. 1.
Figure 5:
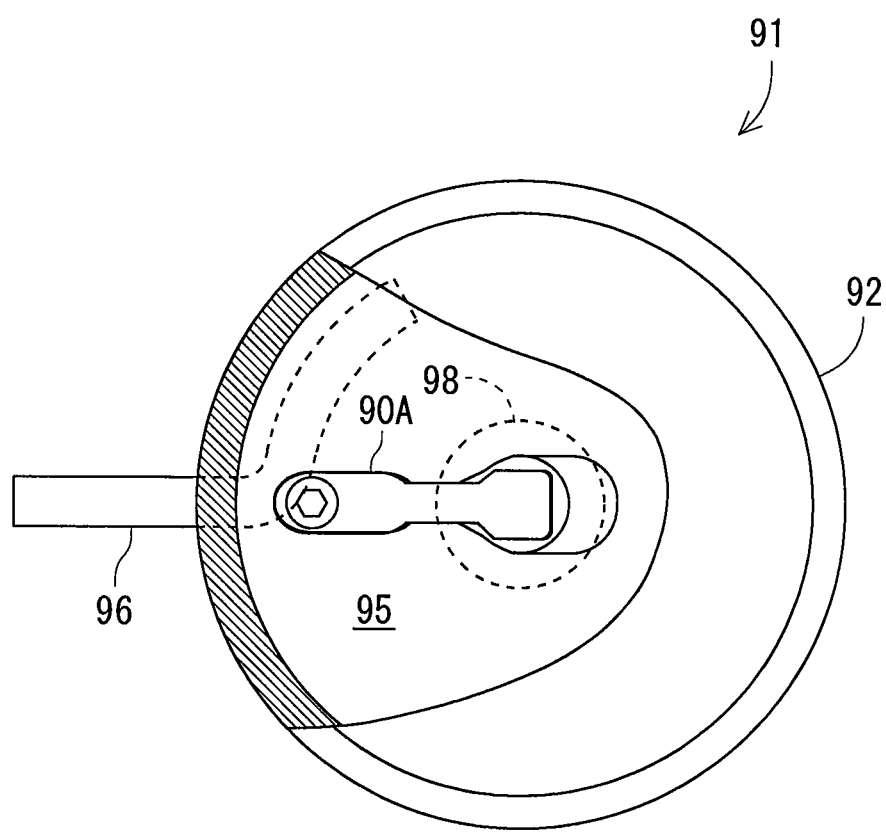
FIG. 5 is a partially sectional plan view of the refrigerant regulator of FIG. 4.

The high pressure discharge piping line 42 of each compressor 11 in the present embodiment is provided with the refrigerant regulator 91. Here, the refrigerant regulator 91 will be described with reference to a partially sectional vertical side view of the refrigerant regulator 91 of FIG. 4 and a partially sectional plan view of FIG. 5. The refrigerant regulator 91 comprises a sealed container 92 having a predetermined capacity, and a refrigerant inflow portion 96 is formed to be connected to the side surface of the container 92, through which the refrigerant discharged from the compressor 11 through the high stage side discharge port 28 flows into the container. The portion is connected to the high pressure discharge piping line 42 (a high stage side discharge port 28 side). Moreover, a refrigerant outflow portion 97 is formed to be connected to the upper end face of the container 92, through which the refrigerant is discharged from the container 92. The portion is connected to the high pressure discharge piping line 42 (a gas cooler 46 side).

Moreover, the inside of the container 92 is vertically partitioned by a partition wall 93, the downside is a refrigerant inflow chamber 94, and the upside is a refrigerant outflow chamber 95. The refrigerant inflow chamber 94 is formed to be connected to the refrigerant inflow portion 96 and the refrigerant outflow chamber 95 is formed to be connected to the refrigerant outflow portion 97. Furthermore, a suction port 98 is disposed on a refrigerant inflow chamber 94 side of the partition wall 93, and the suction port 98 is formed to be connected to a suction passage 99 formed in the partition wall 93.

On a refrigerant outflow chamber 95 side of the suction passage 99, the check valve 90 comprising a lead valve is positioned in the upper part of the container 92. The check valve 90 has a direction from the refrigerant inflow chamber 94 side to the refrigerant outflow chamber 95 as a forward direction (the direction from the high stage side discharge port 28 of the compressor 11 to the gas cooler 46 (the oil separator 44) is the forward direction). Moreover, in the vicinity of the check valve 90, a support member 90A is fixed with a predetermined space being left from the check valve 90.

Furthermore, the container lower end portion of the container 92 is provided with an oil return tube 86 connected to the compressor 11. The oil return tube 86 is connected to the oil return circuit 73 and is, accordingly, connected to the inside of the container 92.

According to the above constitution, the refrigerant discharged from the compressor 11 through the high stage side discharge port 28 flows into the refrigerant inflow chamber 94 through the refrigerant inflow portion 96 of the refrigerant regulator 91 via the high pressure discharge piping line 42. Here, since the refrigerant inflow chamber 94 has a predetermined volume, pulsation can be absorbed by a muffler effect to achieve leveling.

The refrigerant in the refrigerant inflow chamber 94 flows through the suction passage 99 via the suction port 98, and is discharged from the refrigerant inflow chamber 94 to the refrigerant outflow chamber 95 via the check valve 90 having the forward direction on the refrigerant outflow chamber 95 side. Since the check valve 90 comprises the lead valve as described above, generation of the noises can be prevented.

Moreover, the refrigerant in the refrigerant outflow chamber 95 is discharged to the high pressure discharge piping line 42 extending to the gas cooler 46 via the refrigerant outflow portion 97.

Here, in the container 92 of the refrigerant regulator 91, there is disposed the check valve 90 having a direction from the high stage side discharge port 28 of the compressor 11 to the gas cooler 46 (the oil separator 44) as the forward direction. Therefore, even when the compressor 11 stops, the high-pressure refrigerant on the gas cooler 46 side does not flow toward the compressor 11 side by the check valve 90 of the refrigerant regulator 91 disposed in the high pressure discharge piping line 42. In consequence, even when the operation of the compressor 11 stops and the pressures on the high and medium pressure sides of the sealed container 12 are equalized, the pressure on the high pressure side of the refrigerant circuit 1 including the check valve 90 and the main reducing means 62A and 62B disposed in the vicinity of the evaporators 63A and 63B can be kept.

That is, when the check valve 90 is not disposed, the pressures on the high and medium pressure sides are equalized in the stopped compressor 11. On the other hand, the pressures of the low and medium pressure sides in the sealed container 12 are not easily equalized because the only low pressure side is immersed into the oil. However, since a pressure difference is large in the refrigerant circuit 1 at the start of the compressor 11, predetermined time is necessary until the whole pressure in the refrigerant circuit 1 is equalized, thereby deteriorating start properties.

However, in the present embodiment, after the stop of the compressor 11, the high pressure side pressure of the refrigerant circuit 1 can be kept by the check valve 90, to improve the start properties of the compressor 11. Moreover, since the whole pressure in the refrigerant circuit 1 is not equalized, the efficiency of a refrigerating cycle apparatus can be improved.

Moreover, when the refrigerating apparatus R is provided with a plurality of, i.e., two compressors 11 and 11 in this case and the compressors are connected in parallel with each other as in the present embodiment, the refrigerant regulators 91 comprising the check valves 90 and corresponding to the compressors 11 are disposed at positions before the high pressure discharge piping lines 42 and 42 of the compressors 11 and 11 join each other. This enables an additional operation of the compressor having a multiple constitution, whereby it is possible to improve capacity control properties.

Since the container 92 of the refrigerant regulator 91 comprising the check valve 90 has the predetermined capacity as described above, the function of the oil separator which separates the oil from the refrigerant can be performed. The oil accumulated in the lower parts of the containers 92 can smoothly be returned to the corresponding compressors 11 and 11 via the oil return tubes 86 disposed in the lower end portions of the containers.

A Defrost Control of Evaporator Will be Described as (H).

As described above, the showcase units 5A and 5B are connected in parallel with the refrigerant piping lines 7 and 9, respectively. The case-side refrigerant piping lines 60A and 60B which connect the showcase units 5A and 5B to the refrigerant piping lines 7 and 9 are successively connected to the strainers 61A and 61B, the main reducing means 62A and 62B and evaporators 63A and 63B.

Moreover, the one evaporator 63A on the outlet side is connected to a first communicating tube 64A connected to the main reducing means 62B corresponding to the other evaporator 63B on the inlet side, and the first communicating tube 64A is provided with an electromagnetic valve (a valve device) 65A. Furthermore, the other evaporator 63B on the outlet side is connected to a second communicating tube 64B connected to the main reducing means 62A corresponding to the one evaporator 63A on the inlet side, and the second communicating tube 64B is provided with an electromagnetic valve (a valve device) 65B. It is to be noted that in the present embodiment, the main reducing means 62A and 62B comprise electromotive expansion valves, but each main reducing means may comprise a capillary tube as reducing means, a bypass tube which bypasses the tube and an electromagnetic valve.

Furthermore, on the downstream side of a branching unit for each of the communicating tubes 64A and 64B connected to the evaporators 63A and 63B of the case-side refrigerant piping lines 60A and 60B on the outlet side, electromagnetic valves (valve devices) 66A and 66B are interposed. The electromagnetic valves 65A, 65B, 66A and 66B constitute flow path control means.

On the other hand, as described above, there is disposed the gas cooler bypass circuit 71 which bypasses the gas cooler 46 constituting the refrigerant circuit 1. The gas cooler bypass circuit 71 is provided with the electromagnetic valve 72. Moreover, the electromagnetic valves 65A, 65B, 66A, 66B and 72 and the main reducing means 62A and 62B are controlled to open and close by the control device C described above.

First, defrost control of the one evaporator 63A having the above constitution will be described. When the one evaporator 63A is defrosted, the control device C controls the above flow path control means so that the refrigerant discharged from the evaporator 63A flows through the first communicating tube 64A and the refrigerant exiting from the evaporator 63B returns to the compressor 11. That is, the control device fully opens the main reducing means 62A corresponding to the evaporator 63A, and opens the electromagnetic valve 65A of the first communicating tube 64A and the electromagnetic valve 66B. The control device closes the electromagnetic valve 65B of the second communicating tube 64B and the electromagnetic valve 66A. It is to be noted that when the main reducing means 62A comprises the capillary tube, the bypass tube which bypasses this tube and the electromagnetic valve, the control device opens the electromagnetic valve of the bypass tube.

In consequence, the high-temperature high-pressure refrigerant discharged from the compressor 11 flows through the gas cooler 46, the exhaust heat recovery heat exchanger 70, the intermediate heat exchanger 80 and the refrigerant piping line 7 to reach the case-side refrigerant piping line 60A, and the gas refrigerant flows as it is through the fully opened main reducing means 62A into the one evaporator 63A. The refrigerant (the gas refrigerant when the gas cycle is performed) liquefied by defrosting the evaporator 63A flows through the first communicating tube 64A into the main reducing means 62B corresponding to the other evaporator 63B on the inlet side, because the electromagnetic valve 66A is closed and the electromagnetic valve 65A is opened.

Therefore, the refrigerant liquefied by defrosting the one evaporator 63A has a pressure thereof reduced by the main reducing means 62B corresponding to the other evaporator 63B and is expanded to evaporate in the other evaporator 63B. This can eliminate a disadvantage that the refrigerant liquefied by defrosting the one evaporator 63A directly returns to the compressor 11.

When the other evaporator 63B is defrosted, the control device C controls the above flow path control means so that the refrigerant exiting from the evaporator 63B flows through the second communicating tube 64B and the refrigerant exiting from the evaporator 63A returns to the compressor 11. That is, the control device fully opens the main reducing means 62B corresponding to the evaporator 63B, and opens the electromagnetic valve 65B of the second communicating tube 64B and the electromagnetic valve 66A. The control device closes the electromagnetic valve 65A of the first communicating tube 64A and the electromagnetic valve 66B.

In consequence, the high-temperature high-pressure refrigerant discharged from the compressor 11 flows through the gas cooler 46, the exhaust heat recovery heat exchanger 70, the intermediate heat exchanger 80 and the refrigerant piping line 7 to reach the case-side refrigerant piping line 60B, and the gas refrigerant flows as it is through the fully opened main reducing means 62B into the other evaporator 63B. The refrigerant (the gas refrigerant when the gas cycle is performed) liquefied by defrosting the evaporator 63B flows through the second communicating tube 64B into the main reducing means 62A corresponding to the one evaporator 63A on the inlet side, because the electromagnetic valve 66B is closed and the electromagnetic valve 65B is opened. Therefore, the refrigerant liquefied by defrosting the other evaporator 63B has a pressure thereof reduced by the main reducing means 62A corresponding to the one evaporator 63A and is expanded to evaporate in the one evaporator 63A.

In this way, in the refrigerating apparatus R comprising the plurality of evaporators 63A and 63B, the refrigerant liquefied by defrosting the one evaporator is subjected to an evaporation treatment by the other evaporator, which can eliminate a disadvantage that the refrigerant liquefied by defrosting the evaporator directly returns to the compressor 11. Moreover, it is possible to realize the defrosting of the evaporators 63A and 63B by such a simple constitution.

It is to be noted that in the present embodiment, the defrosting of the evaporators 63A and 63B of the two refrigerator units 5A and 5B has been described as the example, but when the number of the evaporators is further increased, the refrigerant liquefied by defrosting the one evaporator is subjected to the evaporation treatment by the other evaporator, which can produce the effect of the present invention.

Moreover, in the present embodiment, when the temperature detected by the outdoor temperature sensor 56 is the predetermined low temperature, the control device C opens the electromagnetic valve 72 disposed in the gas cooler bypass circuit 71 during the defrosting. This allows the high-temperature refrigerant avoiding the gas cooler 46 having the supercritical cycle (flowing through the gas cooler bypass circuit 71) to flow into the evaporator to be defrosted.

In consequence, in a case where at the low outdoor temperature or the like, the temperature of the refrigerant flowing into the evaporator to be defrosted is low, it is possible to supply the refrigerant having a higher temperature, which can realize efficient defrosting.

Moreover, it is possible to realize the defrosting by use of exhaust heat, which can obviate the need for special heating means such as a heater, thereby achieving energy saving. Furthermore, heater energization during the defrosting can be avoided to cut peak power.

When carbon dioxide is used as the refrigerant as in the present embodiment, the temperature of the refrigerant discharged from the compressor 11 becomes high, which can enhance the defrosting performance of the evaporator.

What is claimed is:

1. A refrigerating apparatus in which a refrigerant circuit includes a compression means, a gas cooler, auxiliary reducing means, an intermediate heat exchanger, main reducing means and an evaporator, the refrigerating apparatus being configured to branch a refrigerant exiting from the gas cooler into two flows, pass a first refrigerant flow through a first flow path of the intermediate heat exchanger via the auxiliary reducing means, pass a second refrigerant flow through a second flow path of the intermediate heat exchanger and then through the evaporator via the main reducing means, perform heat exchange between the first refrigerant flow and the second refrigerant flow in the intermediate heat exchanger, suck the refrigerant exiting from the evaporator into a low pressure portion of the compression means and suck the first refrigerant flow exiting from the intermediate heat exchanger into a medium pressure portion of the compression means, to obtain a supercritical pressure on a high pressure side, the refrigerating apparatus comprising:
control means for controlling the auxiliary reducing means, wherein the control means calculates a first control amount exerted in such a direction as to increase an open degree of the auxiliary reducing means in a case where a temperature DT of the refrigerant discharged from the compression means is higher than a predetermined value DT0,
a second control amount exerted in such a direction as to increase the open degree of the auxiliary reducing means in a case where an over-compression judgment value MPO obtained from a pressure MP of a medium pressure region of the refrigerant circuit and a low pressure side pressure LP of the refrigerant circuit is lower than a high pressure side pressure HP of the refrigerant circuit, and
a third control amount exerted in such a direction as to increase the open degree of the auxiliary reducing means in a case where a difference (GCT-LT) between a temperature GCT of the refrigerant discharged from the gas cooler and a temperature LT of the second refrigerant flow discharged from the intermediate heat exchanger is smaller than a predetermined value SP, and the control means adds up the first to third control amounts to determine an operation amount of the valve open degree of the auxiliary reducing means.

2. The refrigerating apparatus according to claim 1, wherein the control means determines the operation amount in such a direction as to decrease the valve open degree of the auxiliary reducing means in a case where the temperature LT is lower than a predetermined value or a temperature DT-GCT is lower than a predetermined value TDT.

3. The refrigerating apparatus according to claim 2, wherein the control means raises the predetermined value SP and lowers the predetermined value TDT in a case where the high pressure side pressure HP is in a supercritical range, and the control means lowers the predetermined value SP and raises the predetermined value TDT in a case where the high pressure side pressure HP is in a saturated range.

4. The refrigerating apparatus according to claim 1, wherein the compression means comprises first and second compression elements, and sucks the refrigerant from the refrigerant circuit on a low pressure side into the first compression element to compress the refrigerant, sucks the refrigerant discharged from the first compression element and having a medium pressure into the second compression element to compress the refrigerant, and discharges the refrigerant to the refrigerant circuit on the high pressure side,
the refrigerating apparatus further comprising an intercooler which air-cools the refrigerant discharged from the first compression element, wherein the first refrigerant flow exiting from the intermediate heat exchanger is returned to the intercooler on an outlet side.

5. The refrigerating apparatus according to claim 1, wherein carbon dioxide is used as the refrigerant.

6. A refrigerating apparatus in which a refrigerant circuit includes a compression means, a gas cooler, auxiliary reducing means, an intermediate heat exchanger, main reducing means and an evaporator, the refrigerating apparatus being configured to branch a refrigerant exiting from the gas cooler into two flows, pass a first refrigerant flow through a first flow path of the intermediate heat exchanger via the auxiliary reducing means, pass a second refrigerant flow through a second flow path of the intermediate heat exchanger and then through the evaporator via the main reducing means, perform heat exchange between the first refrigerant flow and the second refrigerant flow in the intermediate heat exchanger, suck the refrigerant exiting from the evaporator into a low pressure portion of the compression means and suck the first refrigerant flow exiting from the intermediate heat exchanger into a medium pressure portion of the compression means, to obtain a supercritical pressure on a high pressure side, the refrigerating apparatus comprising:

- control means for controlling the auxiliary reducing means, wherein the control means calculates a first control amount exerted in such a direction as to increase an open degree of the auxiliary reducing means in a case where a temperature DT of the refrigerant discharged from the compression means is higher than a predetermined value DT0,
- a second control amount exerted in such a direction as to increase the open degree of the auxiliary reducing means in a case where a pressure MP of a medium pressure region of the refrigerant circuit is lower than an adequate medium pressure value obtained from a high pressure side pressure HP and a low pressure side pressure LP of the refrigerant circuit, and
- a third control amount exerted in such a direction as to increase the open degree of the auxiliary reducing means in a case where a difference (GCT-LT) between a temperature GCT of the refrigerant discharged from the gas cooler and a temperature LT of the second refrigerant flow discharged from the intermediate heat exchanger is smaller than a predetermined value SP, and the control means adds up the first to third control amounts to determine an operation amount of the valve open degree of the auxiliary reducing means.

* * * * *